US008928747B2

(12) United States Patent
Burdoucci

(10) Patent No.: US 8,928,747 B2
(45) Date of Patent: Jan. 6, 2015

(54) INTERACTIVE HAIR GROOMING APPARATUS, SYSTEM, AND METHOD

(76) Inventor: Romello J. Burdoucci, Orlando, FL (US)

( * ) Notice: Subject to any disclaimer, the term of this patent is extended or adjusted under 35 U.S.C. 154(b) by 459 days.

(21) Appl. No.: 13/186,471

(22) Filed: Jul. 20, 2011

(65) Prior Publication Data

US 2013/0021460 A1 Jan. 24, 2013

(51) Int. Cl.
*H04N 7/18* (2006.01)
*B26B 19/38* (2006.01)
*B26B 21/40* (2006.01)
*A45D 44/00* (2006.01)

(52) U.S. Cl.
CPC ........... *B26B 19/388* (2013.01); *B26B 21/4081* (2013.01); *A45D 44/005* (2013.01)
USPC ........ 348/77; 348/61

(58) Field of Classification Search
CPC ............ H04N 7/18; G06T 15/00; G06K 9/62; A45D 44/005; B26B 19/388; B26B 21/4081
USPC ........... 348/77, 311, 222.1, 376, 61; 382/103, 382/118, 181; 345/419, 642; 356/448; 30/34.05
See application file for complete search history.

(56) References Cited

U.S. PATENT DOCUMENTS

2002/0119428 A1 8/2002 Vitale
2005/0244057 A1* 11/2005 Ikeda et al. .................. 382/181
2005/0276452 A1* 12/2005 Boland ......................... 382/118
2007/0252997 A1* 11/2007 Van Hal et al. ............... 356/448
2008/0175448 A1* 7/2008 Fujiwara et al. .............. 382/118
2009/0303320 A1 12/2009 Davis
2010/0026717 A1* 2/2010 Sato .............................. 345/642
2010/0186234 A1* 7/2010 Binder ......................... 30/34.05
2011/0018985 A1 1/2011 Zhu

OTHER PUBLICATIONS

International Search Report, Apr. 22, 2013.

* cited by examiner

*Primary Examiner* — Jessica M Prince
*Assistant Examiner* — Richard Carter
(74) *Attorney, Agent, or Firm* — Beusse Wolter Sanks & Maier, P.A.; Terry M. Sanks, Esq.

(57) ABSTRACT

The present invention relates to an intelligent interactive apparatus, system and method that aligns with grooming tools such as hair clippers or trimmers. More particularly, the present invention relates to a hair clipper having an attached imaging apparatus assembly that is linked to a display output device allowing for more intelligent and consistent hair grooming views and overall control. The clipper imaging apparatus assembly of the present invention allows for an intelligent interactive system wherein the method used makes a user capable of a more accurate hair grooming experience. The present invention's system is linked by superimposed hair design overlays, and an interactive imaging apparatus for an improved viewing method. The imaging device enables a more accurate grooming experience using an imaging sensor that intelligently follows a grid mapping axis process using predictive analytics to reduce grooming errors and difficulty.

19 Claims, 11 Drawing Sheets

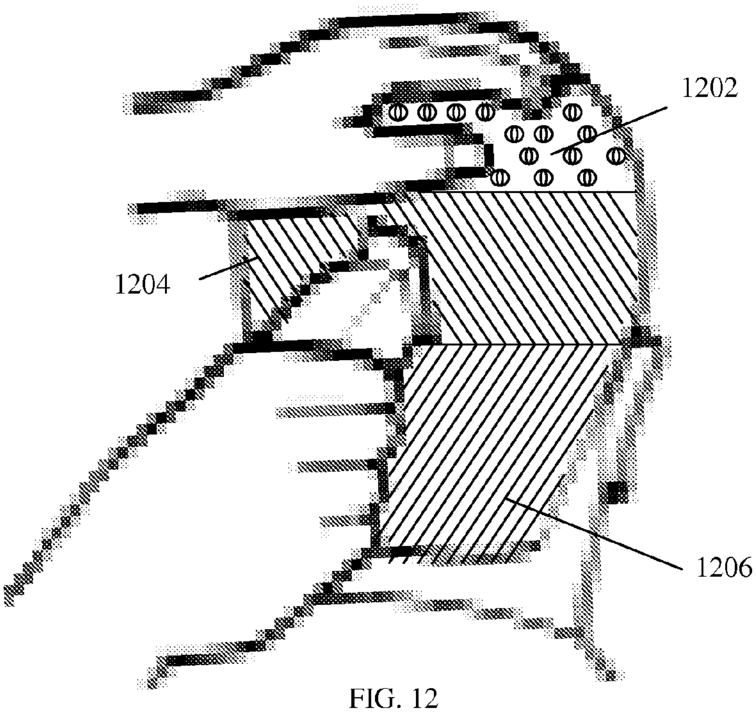

FIG. 12

1302 1304

| Sample Grid for Instructional Training Hair Design System | | | |
|---|---|---|---|
| Comb # | Hair Cutting Length | Hair Design Style | Movement Motion |
| Short attachment comb #1 | Cuts hair 1/8 inch | Low buzz cut | Upward wrist flick |
| Med-Short attachment comb #2 | Cuts hair 1/4 inch | Low buzz fade | Downward wrist |
| Med-Long attachment comb #3 | Cuts hair 3/8 inch | Med buzz fade | Steady plane motion |
| Long attachment comb #4 | Cuts hair 1/2 inch | High buzz fade | Upward wrist flick steady motion |
| Long attachment comb #5 | Cuts hair 5/8 inch | Sloop buzz | Downward wrist flick overall plane |
| Long attachment comb #6 | Cuts hair 3/4 inch | High Sloop | Steady plane with grain |

1306 1308

FIG. 13

INTERACTIVE HAIR GROOMING APPARATUS, SYSTEM, AND METHOD

BACKGROUND OF THE INVENTION

The present invention relates generally to an interactive method, system, and apparatus for displaying views and superimposed design style overlays for grooming hair to a desired design style. The invention provides improved visual angels for a surface area plane, and optical sensory digital imaging processing while grooming hair that enables the user to also be instructed on the accuracy of grooming techniques using superimposed overlays interfaced with a camera FIG. 18 (viewing device), having an elongated high impact plastic material embodiment structure, and the hair grooming trimmer 1006 tool as the preferred embodiment in order to achieve a desired hair design style. The invention 102 comprises a system, method, and apparatus for instructional guidance training in order to achieve a desired hair design style using autonomous guidance control system for overlay instructional training.

Also, the present invention uses a predictive analytical analysis process of optically determining a change in grooming for comparing hair grooming accuracy based on the superimposed design overlay to guide the user in order to achieve a desired hair design style. According to the present invention, operational control of a grooming hair style design tool using artificial intelligence, and superimposed design styles overlays for grooming hair is embodied, which will allow a sensor to convert image processing to instruct the apparatus controller to operate further allowing the invention to automatically be controlled using microchip 310 embedded processor in order to achieve a desired hair design style. More specifically, this invention relates to the use of various types of grooming tools, such as but not limited to trimmers whereby more accurate grooming of targeted area is achieved.

When a consumer purchases a hair grooming tool such as a trimmer kit; or when visiting a selected hair stylist, the consumer is unaware of the complexities involved with grooming their hair personally; or whether the hair stylist has enough experience to groom the consumer's hair to their desired design style. At home, the consumer must rely on an inexperienced associate to groom their hair 402 or use a tool such as a mirror FIG. 4 at odd and uncomfortable angles to better gauge the desired method to grooming their hair to a preferred design style as a disadvantage shown in U.S. Pat. No. 7,281,461 and illustrated as prior art in FIG. 17. Referring now to example of prior art being U.S. Pat. No. 7,281,461 FIG. 17, a self-user is shown holding and using the present hair clipper 1702 in various grips and angled positions. In FIG. 17, a self-user is shown holding the hair clipper 1704 in a left hand and using it to clip hair on the left side of the head. In FIG. 17, a self-user is shown holding the hair clipper 1710 in a right hand and using it to clip hair on the right side of the head. In FIG. 17, the blade assembly 1708 carrying the bladeset 1706 is rotated to one of the two positions discussed above as prior art, and in FIG. 17, the blade assembly 1708 carrying the bladeset 1706 is rotated to the other of the two positions discussed above.

U.S. Pat. No. 5,579,581 assigned on its face to Wahl Clipper Corporation is directed to a clipper blade having multiple cutting edges, namely a cutting edge at each end of the blade. However, the cutting edges on each end are substantially identical such that each blade can be used as either of the fixed blade or the moving blade. Thus, the use of superimposed design overlays for grooming assistance to guide user operations of the same blade assembly is not provided.

U.S. Pat. No. 5,606,799 also assigned on its face to Wahl Clipper Corporation is directed to a hair clipper having a ball and-socket connection being provided between the handle and the blade assembly. The ball-and-socket configuration allows the blade assembly to be pivoted with respect to the handle. However, the ability to rotate the blade assembly about an axis substantially normal to the cutting plane defined by the blade assembly or a viewing apparatus to view targeted grooming areas is not provided.

U.S. Pat. No. 5,970,616 is also assigned on its face to Wahl Clipper Corporation. This patent is directed to a hair trimmer that includes a blade housing that is rotatable about an axis substantially parallel to the axis of the handle to vary the angular orientation of the blade housing with respect to the handle. However, the ability to rotate the blade assembly about an axis substantially normal to the cutting plane defined by the blade assembly is not provided. Moreover, the use of intelligent interactive accuracy analysis system is also not provided to afford the user some grooming assistance.

Also as discussed above, the blade assembly 1706 is retained in the selected rotational position by the interaction of the lock extension 1708. In this embodiment, a bladeset 1710 is positioned at a particular angle relative to the hair strands to be trimmed. Further, the hair strands are guided toward a cutting zone "Z" of the bladeset 1706 and retained in the cutting zone "Z.". This, in turn permits a self-user to hold the hair clipper 1704 to position the bladeset at a particular angle in relation to the hair to be trimmed by uncomfortably twisting or pronating and supinating the wrist and forearm, as opposed to bending the wrist sideways at an awkward angle, known as ulnar deviation.

However, if a user performing these repeated un-natural awkwardly angular twists of the wrist without any true; and visually accurate, reference to guide their work, the potential for excessive wear on the wrist could result in decreased stamina or injury in future grooming efforts and assurances that the targeted grooming plane is groomed correctly based on consumer's desired style. When this particular angle of attack of the trimmer or bladeset 1710 relative to the head is substantially a right angle to the hair to be trimmed, a cross-section of the hair presented to the bladeset 1710 to be trimmed is substantially illustrative of the difficulty of grooming hair correctly. Any discussion of the prior art throughout the specification should in no way be considered as an admission that such prior art is widely known or forms part of common general knowledge in the field. Neither solution is desirable to the consumer. Multiple devices are duplicative and expensive while not allowing more intelligent grooming assistance. Thus, it is desirable to provide a grooming device such as a hair clipper or trimmer that permits improved views of targeted grooming area.

Those skilled in the art should be able to understand the scope of the present invention and the notated prior art patents are representative of this scope as the present invention overcomes the disadvantages:

Their manufacture process does not include the use of an imaging device capable of capturing targeted grooming areas on a selected plane, thereby not allowing the consumer to self use the grooming tool in a more efficient and accurate manner while trimming or clipping their or another's hair.

The practice of a self use grooming tool being used is hampered by the user not being aware of the instructional steps needed to groom hair to a desired style.

Accordingly, there is a continuing need for hair clippers capable of providing an intuitive method for grooming hair while using a sensor and imaging processor that present more grooming control to the user. Moreover, there is a continuing need for such a hair clipper or trimming hair grooming device that controls the blade assembly to match operations to the hair design outlined within the superimposed overlays to insure control over quality results when grooming hair.

The following is a tabulation of some prior art that presently appears relevant:

U.S. Patents

| Pat. No. | Kind Code | Issue Date | Patentee |
|---|---|---|---|
| 4,949,460 | A | Aug. 21, 1990 | Sterk |
| 4,951,394 | A | Aug. 28, 1990 | Meijer |
| D310,272 | A | Aug. 28, 1990 | Gallanis, et al |
| D310734 | A | Sep. 18, 1990 | Gallanis |
| 4,958,432 | A | Sep. 25, 1990 | Marshall |
| 5,012,147 | A | Apr. 30,1991 | Bertram, et al |
| 5,012,576 | A | May 07,1991 | Johannesson |
| 5,012,830 | A | May 07, 1991 | Vaccaro, et al |
| 5,031,315 | A | Jul. 16, 1991 | Labrijn |
| D319324 | A | Aug. 20, 1991 | Wahl, et al |
| 5,050,300 | A | Sep. 24, 1991 | Miska |
| 5,050,305 | A | Sep. 24, 1991 | Baker, et al |
| 5,052,106 | A | Oct. 01, 1991 | Labrijn |
| 5,054,199 | A | Oct. 08, 1991 | Ogawa, et al |
| D320673 | A | Oct. 08, 1991 | Sterk |
| 5,075,971 | A | Dec. 31, 1991 | McCambridge |
| 5,084,967 | A | Feb. 04, 1992 | Nakagawa, et al |
| D336545 | A | Jun. 15, 1993 | McCambridge, et al |
| 5,230,153 | A | Jul. 27, 1993 | Andis |
| 5,233,746 | A | Aug. 10, 1993 | Heintke |
| 5,235,749 | A | Aug. 17, 1993 | Hildebrand, et al |
| 5,245,754 | A | Sep. 21, 1993 | Heintke, et al |
| D339655 | A | Sep. 21, 1993 | Sulik |
| D340783 | A | Oct. 26, 1993 | McCambridge |
| 5,257,456 | A | Nov. 02, 1993 | Franke, et al |
| 5,283,953 | A | Feb 08, 1994 | Ikuta, et al |
| 5,289,636 | A | Mar. 01, 1994 | Eichhorn, et al |
| 5,325,590 | A | Jul. 05, 1994 | Andis, et al |
| 5,333,382 | A | Aug. 02, 1994 | Buchbinder |
| 5,343,621 | A | Sep. 06, 1994 | Hildebrand, et al |
| D351046 | A | Sep. 27, 1994 | McCambridge, et al |
| D352132 | A | Nov. 01, 1994 | Wagenknecht, et al |
| D353022 | A | Nov. 29, 1994 | Simonelli |
| 5,353,655 | A | Oct. 01, 1994 | Mishler |
| 5,377,414 | A | Jan. 03, 1995 | Buzzi, et al |
| 5,383,273 | A | Jan. 24, 1995 | Muller, et al |
| D355506 | A | Feb. 14, 1995 | Rizzuto, Jr |
| 5,398,412 | A | Mar. 21, 1995 | Tanahashi, et al. |
| 5,400,508 | A | Mar. 28, 1995 | Deubler |
| 5,410,811 | A | May 02, 1995 | Wolf, et al. |
| 5,414,930 | A | May 16, 1995 | Muller, et al. |
| 5,423,125 | A | Jun. 13, 1995 | Wetzel |
| 5,450,671 | A | Sep. 19, 1995 | Harshman |
| 5,463,813 | A | Nov. 7, 1995 | Otsuka, et al. |
| 5,469,536 | A | Nov. 21, 1995 | Blank |
| 5,473,818 | A | Dec. 12, 1995 | Otsuka, et al. |
| 5,479,950 | A | Jan. 02, 1996 | Andrews |
| 5,490,328 | A | Feb. 13, 1996 | Ueda, et al. |
| 5,504,997 | A | Apr. 09, 1996 | Lee |
| 5,507,095 | A | Apr. 16, 1996 | Wetzel, et al. |
| D368984 | A | Apr. 16, 1996 | Nakashima, et al. |
| D369230 | A | Apr. 23, 1996 | Bone |
| 5,524,345 | A | Jun. 11, 1996 | Eichhorn |
| 5,530,334 | A | Jun. 25, 1996 | Ramspeck, et al. |
| 5,539,984 | A | Jul. 30, 1996 | Ikuta, et al. |
| 5,469,536 | A | Nov. 21, 1995 | Blank |
| 5,542,179 | A | Aug. 6, 1996 | Beutel |
| 5,546,659 | A | Aug. 20, 1996 | Tanahashi, et al. |
| 5,548,899 | A | Aug. 27, 1996 | Tanahashi, et al. |
| 5,551,154 | A | Sep. 03, 1996 | Tanahashi, et al. |
| 5,564,191 | A | Oct. 15, 1996 | Ozawa |
| 5,568,040 | A | Oct. 22, 1996 | Krainer, et al. |
| 5,568,688 | A | Oct. 29, 1996 | Andrews |
| D376670 | A | Dec. 17, 1996 | Bellm, et al. |
| 5,577,179 | A | Nov. 19, 1996 | Blank |
| 5,600,890 | A | Feb. 11, 1997 | Leitner, et al. |

-continued

U.S. Patents

| Pat. No. | Kind Code | Issue Date | Patentee |
|---|---|---|---|
| 5,604,985 | A | Feb. 25, 1997 | Andis, et al. |
| 5,604,986 | A | Feb. 25, 1997 | Masuda |
| 5,611,145 | A | Mar. 18, 1997 | Wetzel, et al. |
| 5,611,804 | A | Mar. 18, 1997 | Heintke, et al. |
| D378705 | A | Apr. 01, 1997 | Izumi |
| 5,655,301 | A | Aug. 12, 1997 | Dickson |
| 5,669,138 | A | Sep. 23, 1997 | Wetzel |
| 5,673,711 | A | Oct. 07, 1997 | Andrews |
| 5,685,077 | A | Nov. 11, 1997 | Mukai, et al. |
| 5,687,306 | A | Nov. 11, 1997 | Blank |
| 5,699,616 | A | Dec. 23, 1997 | Ogawa |
| 5,701,673 | A | Dec. 30, 1997 | Ullmann, et al. |
| 5,704,126 | A | Jan. 06, 1998 | Franke, et al. |
| 5,745,995 | A | May 05, 1998 | Yamashita, et al |
| 5,771,580 | A | Jun. 30, 1998 | Tezuka |
| 5,793,188 | A | Aug. 11, 1998 | Cimbal, et al. |
| 5,802,932 | A | Sep. 08, 1998 | Vankov, et al. |
| 5,842,670 | A | Dec. 01, 1998 | Nigoghosian |
| D405923 | A | Feb. 16, 1999 | Yang |
| 5,884,402 | A | Mar. 23, 1999 | Talavera |
| 5,884,404 | A | Mar. 23, 1999 | Ohle, et al. |
| D408102 | A | Apr. 13, 1999 | Van Asten |
| D408587 | A | Apr. 20, 1999 | De Visser |
| 5,901,446 | A | Apr. 20, 1999 | De Visser |
| 5,937,526 | A | Aug. 17, 1999 | Wahl, et al. |
| 5,940,980 | A | Aug. 24, 1999 | Lee, et al. |
| 5,943,777 | A | Aug. 31, 1999 | Hosokawa, et al. |
| 5,956,362 | A | Sep. 21, 1999 | Yokogawa, et al. |
| 5,960,515 | A | Oct. 05, 1999 | Lu |
| 5,964,034 | A | Oct. 12, 1999 | Sueyoshi, et al. |
| 5,964,037 | A | Oct. 12, 1999 | Clark |
| 5,970,616 | A | Oct. 26, 1999 | Wahl, et al. |
| 5,979,056 | A | Nov. 09, 1999 | Andrews |
| 5,980,452 | A | Nov. 09, 1999 | Garenfeld, et al. |
| 5,983,499 | A | Nov. 16, 1999 | Andrews |
| 6,000,135 | A | Dec. 14, 1999 | Ullmann, et al. |
| 6,003,239 | A | Dec. 21, 1999 | Liebenthal, et al. |
| D421818 | A | Mar. 21, 2000 | Mandell, et al. |
| 6,044,558 | A | Apr. 04, 2000 | Wu |
| 6,052,904 | A | Apr. 25, 2000 | Wetzel, et al. |
| 6,052,915 | A | Apr. 25, 2000 | Turner |
| 6,079,103 | A | Jun. 27, 2000 | Melton, et al. |
| 6,082,004 | A | Jul. 04, 2000 | Hotani |
| 6,098,289 | A | Aug. 08, 2000 | Wetzel, et al. |
| D429378 | A | Aug. 08, 2000 | Wu |
| 6,125,857 | A | Oct. 03, 2000 | Silber |
| 6,126,669 | A | Oct. 03, 2000 | Rijken, et al. |
| 6,151,780 | A | Nov. 28, 2000 | Klein |
| 6,178,641 | B1 | Jan. 30, 2001 | Meijer |
| 6,205,666 | B1 | Mar. 27, 2001 | Junk |
| D439703 | B1 | Mar. 27, 2001 | Wagenknecht, et al. |
| 6,219,920 | B1 | Apr. 24, 2001 | Klein |
| 6,223,438 | B1 | May 01, 2001 | Parsonage, et al. |
| 6,226,869 | B1 | May 08, 2001 | Heintke, et al. |
| 6,226,870 | B1 | May 08, 2001 | Barish |
| 6,226,871 | B1 | May 08, 2001 | Eichhorn, et al. |
| 6,233,535 | B1 | May 15, 2001 | Petretty |
| D443725 | B1 | Jun. 12, 2001 | Copland, et al. |
| 6,272,752 | B1 | Aug. 14, 2001 | Pino |
| 6,276,060 | B1 | Aug. 21, 2001 | Faulstich, et al. |
| 6,277,129 | B1 | Aug. 21, 2001 | Poran |
| 6,301,792 | B1 | Oct. 16, 2001 | Speer |
| 6,308,414 | B1 | Oct. 30, 2001 | Parsonage, et al. |
| 6,308,415 | B1 | Oct. 30, 2001 | Sablatschan, et al. |
| 6,312,436 | B1 | Nov. 06, 2001 | Rijken, et al. |
| 6,317,982 | B1 | 2001-20-2001 | Andrew |
| 6,357,117 | B1 | Mar. 19, 2002 | Eichhorn, et al. |
| D455862 | B1 | Apr. 16, 2002 | Wagenknecht, et al. |
| D456095 | B1 | Apr. 23, 2002 | Wagenknecht, et al. |
| 6,378,210 | B1 | Apr. 30, 2002 | Bickford |
| 6,381,849 | B1 | May 07, 2002 | Eichhorn, et al. |
| 6,415,513 | B1 | Jul. 09, 2002 | Eichhorn, et al. |
| 6,427,337 | B1 | Aug. 06, 2002 | Burks |
| 6,493,941 | B1 | Dec. 17, 2002 | Wong |
| 6,505,403 | B1 | Jan. 14, 2003 | Andrews |

-continued

| U.S. Patents | | | |
|---|---|---|---|
| Pat. No. | Kind Code | Issue Date | Patentee |
| 6,536,116 | B1 | Mar. 25, 2003 | Fung |
| 6,553,680 | B1 | 2003-29-2003 | Vazdi |
| 6,560,875 | B1 | May 13, 2003 | Eichhorn, et al. |
| 6,563,529 | B1 | May 13, 2003 | Jongerius |
| 6,574,866 | B1 | Jun. 10, 2003 | Pragt, et al. |
| 6,578,269 | B1 | Jun. 17, 2003 | Wilcox, et al. |
| 6,588,108 | B1 | Jul. 08, 2003 | Talavera |
| 6,601,302 | B1 | Aug. 05, 2003 | Andrew |
| 6,604,287 | B1 | Aug. 12, 2003 | Melton, et al. |
| 6,615,492 | B1 | Sep. 09, 2003 | Parsonage, et al. |
| 6,618,948 | B1 | Sep. 16, 2003 | Lin |
| 6,782,636 | B1 | Aug. 31, 2004 | Feldman |
| 6,792,401 | B1 | Sep. 14, 2004 | Nigro, et al. |
| 6,810,130 | B1 | Oct. 26, 2004 | Aubert, et al. |
| 6,826,835 | B1 | Dec. 07, 2004 | Wong |
| 6,842,172 | B1 | Jan. 11, 2005 | Kobayashi |
| 6,857,432 | B1 | Feb. 22, 2005 | de Laforcade |
| 6,862,810 | B1 | Mar. 08, 2005 | Braun, et al. |
| 6,863,444 | B1 | Mar. 08, 2005 | Anderson, et al. |
| 6,888,963 | B1 | May 03, 2005 | Nichogi |
| 6,892,457 | B1 | May 17, 2005 | Shiba, et al. |
| 6,913,606 | B1 | Jul. 05, 2005 | Saitou, et al. |
| 6,935,029 | B1 | Aug. 30, 2005 | Morisugi, et al. |
| 6,938,867 | B1 | Sep. 06, 2005 | Dirks |
| 6,940,508 | B1 | Sep. 06, 2005 | Lengyel |
| 6,948,248 | B1 | Sep. 27, 2005 | Andis, et al. |
| 6,957,490 | B1 | Oct. 25, 2005 | Wilcox |
| 6,959,119 | B1 | Oct. 25, 2005 | Hawkins, et al. |
| 6,968,623 | B1 | Nov. 29, 2005 | Braun, et al. |
| 6,973,931 | B1 | Dec. 13, 2005 | King |
| 6,978,547 | B1 | Dec. 27, 2005 | Degregorio, Jr. |
| 6,985,611 | B1 | Jan. 10, 2006 | Loussouarn, et al. |
| 6,986,206 | B1 | Jan. 17, 2006 | McCambridge, et al. |
| 6,987,520 | B1 | Jan. 17, 2006 | Criminisi, et al. |
| 6,993,168 | B1 | Jan. 31, 2006 | Loussouarn, et al. |
| 7,007,388 | B1 | Mar. 07, 2006 | Wan |
| 7,040,021 | B1 | May 09, 2006 | Talavera |
| 7,047,649 | B1 | May 23, 2006 | Pleshek |
| 7,057,374 | B1 | Jun. 06, 2006 | Freas, et al. |
| 7,072,526 | B1 | Jul. 04, 2006 | Sakuramoto |
| 7,073,262 | B1 | Jul. 11, 2006 | Melton |
| 7,076,878 | B1 | Jul. 18, 2006 | Degregorio, Jr. |
| 7,080,458 | B1 | Jul. 25, 2006 | Andis |
| 7,082,211 | B1 | Jul. 25, 2006 | Simon, et al. |
| 7,088,870 | B1 | Aug. 8, 2006 | Perez, et al. |
| 7,100,286 | B1 | Sep. 05, 2006 | Nakakura, et al. |
| 7,102,328 | B1 | Sep. 05, 2006 | Long, et al. |
| 7,103,980 | B1 | Sep. 12, 2006 | Leventhal |
| 7,108,690 | B1 | Sep. 19, 2006 | Lefki, et al. |
| 7,114,954 | B1 | Oct. 03, 2006 | Eggert, et al. |
| 7,127,118 | B1 | Oct. 24, 2006 | Burke |
| 7,133,846 | B1 | Nov. 07, 2006 | Ginter, et al. |
| 7,149,665 | B1 | Dec. 12, 2006 | Feld, et al. |
| 7,171,752 | B1 | Feb. 06, 2007 | Lee |
| 7,188,422 | B1 | Mar. 13, 2007 | McCambridge, et al. |
| 7,199,793 | B1 | Apr. 03, 2007 | Oh, et al. |
| 7,224,475 | B1 | May 29, 2007 | Robertson, et al. |
| 7,233,337 | B1 | Jun. 19, 2007 | Lengyel |
| 7,260,248 | B1 | Aug. 21, 2007 | Kaufman , et al. |
| 7,269,292 | B1 | Sep. 11, 2007 | Steinberg |
| 7,281,461 | B1 | Oct. 26, 2007 | McCambridge, et al. |
| 7,284,604 | B1 | Oct. 23, 2007 | Robertson, et al. |
| 7,290,349 | B1 | Nov. 06, 2007 | Carpenter |
| 7,298,374 | B1 | Nov. 20, 2007 | Styles |
| 7,315,630 | B1 | Jan. 01, 2008 | Steinberg, et al. |
| 7,317,815 | B1 | Jan. 08, 2008 | Steinberg, et al. |
| 7,324,668 | B1 | Jan. 29, 2008 | Rubinstenn, et al. |
| 7,339,516 | B1 | Mar. 04, 2008 | Thompson, et al. |
| 7,346,990 | B1 | Mar. 25, 2008 | Dirks, et al. |
| 7,348,973 | B1 | Mar. 25, 2008 | Gibbs, et al. |
| 7,355,597 | B1 | Apr. 08, 2008 | Laidlaw, et al. |
| 7,362,368 | B1 | Apr. 22, 2008 | Steinberg, et al. |
| 7,367,127 | B1 | May 06, 2008 | Nakakura, et al. |
| 7,369,271 | B1 | May 06, 2008 | Itagaki |
| 7,379,584 | B1 | May 27, 2008 | Rubbert, et al. |

-continued

| U.S. Patents | | | |
|---|---|---|---|
| Pat. No. | Kind Code | Issue Date | Patentee |
| 7,382,394 | B1 | Jun. 03, 2008 | Niland, et al. |
| 7,480,546 | B1 | Aug. 05, 2008 | Serra |
| 7,413,567 | B1 | Aug. 19, 2008 | Weckwerth, et al. |
| 7,415,768 | B1 | Aug. 26, 2008 | Bader, et al. |
| 7,418,371 | B1 | Aug. 26, 2008 | Choe, et al. |
| 7,421,097 | B1 | Sep. 02, 2008 | Hamza, et al. |
| 7,427,991 | B1 | Sep. 23, 2008 | Bruderlin, et al. |
| 7,429,943 | B1 | Sep. 30, 2008 | Nygard, et al. |
| 7,437,344 | B1 | Oct. 14, 2008 | Peyrelevade |
| 7,440,013 | B1 | Oct. 21, 2008 | Funakura |
| 7,440,593 | B1 | Oct. 21, 2008 | Steinberg, et al. |
| 7,450,122 | B1 | Nov. 11, 2008 | Petrovic, et al. |
| 7,460,130 | B1 | Dec. 02, 2008 | Salganicoff |
| 7,466,866 | B1 | Dec. 16, 2008 | Steinberg |
| 7,500,755 | B1 | Mar. 10, 2009 | Ishizaki, et al. |
| 7,508,393 | B1 | Mar. 24, 2009 | Gordon, et al. |
| 7,528,989 | B1 | May 05, 2009 | Nishide, et al. |
| 7,548,238 | B1 | Jun. 16, 2009 | Berteig, et al. |
| 7,551,181 | B1 | Jun. 23, 2009 | Criminisi, et al |
| 7,551,754 | B1 | Jun. 23, 2009 | Steinberg, et al. |
| 7,551,755 | B1 | Jun. 23, 2009 | Steinberg, et al. |
| 7,554,694 | B1 | Jun. 30, 2009 | Itagaki |
| 7,555,148 | B1 | Jun. 30, 2009 | Steinberg, et al. |
| 7,558,408 | B1 | Jul. 07, 2009 | Steinberg, et al. |
| 7,574,016 | B1 | Aug. 11, 2009 | Steinberg, et al. |
| 7,576,725 | B1 | Aug. 18, 2009 | Bathiche, et al. |
| 7,587,068 | B1 | Sep. 08, 2009 | Steinberg, et al. |
| 7,590,538 | B1 | Sep. 15, 2009 | St. John |
| 7,602,949 | B1 | Oct. 13, 2009 | Simon, et al. |
| 7,609,261 | B1 | Oct. 27, 2009 | Gibbs, et al. |
| 7,614,955 | B1 | Nov. 10, 2009 | Farnham, et al. |
| 7,616,233 | B1 | Nov. 10, 2009 | Steinberg, et al. |
| 7,626,569 | B1 | Dec. 01, 2009 | Lanier |
| 7,630,527 | B1 | Dec. 08, 2009 | Steinberg, et al. |
| 7,634,103 | B1 | Dec. 15, 2009 | Rubinstenn, et al. |
| 7,634,109 | B1 | Dec. 15, 2009 | Steinberg, et al. |
| 7,636,485 | B1 | Dec. 22, 2009 | Simon, et al. |
| 7,643,671 | B1 | Jan. 05, 2010 | Dong, et al. |
| 7,643,685 | B1 | Jan. 05, 2010 | Miller |
| 7,684,630 | B1 | Mar. 23, 2010 | Steinberg |
| 7,702,136 | B1 | Apr. 20, 2010 | Steinberg, et al. |
| 7,704,146 | B1 | Apr. 27, 2010 | Ellis |
| 7,706,636 | B1 | Apr. 27, 2010 | Higashino, et al. |
| 7,714,858 | B1 | May 11, 2010 | Isard, et al. |
| 7,720,276 | B1 | May 18, 2010 | Korobkin |
| 7,724,290 | B1 | May 25, 2010 | Perotti, et al. |
| 7,725,096 | B1 | May 25, 2010 | Riveiro, et al. |
| 7,726,890 | B1 | Jun. 01, 2010 | Camera |
| 7,728,845 | B1 | Jun. 01, 2010 | Holub |
| 7,728,904 | B1 | Jun. 01, 2010 | Quan, et al. |
| 7,728,965 | B1 | Jun. 01, 2010 | Haller, et al. |
| 7,729,059 | B1 | Jun. 01, 2010 | Yuan |
| 7,729,512 | B1 | Jun. 01, 2010 | Nishiyama |
| 7,729,529 | B1 | Jun. 01, 2010 | Wu, et al |
| 7,729,538 | B1 | Jun. 01, 2010 | Shilman, et al |
| 7,729,543 | B1 | Jun. 01, 2010 | Murashita, et al |
| 7,729,547 | B1 | Jun. 01, 2010 | Sato |
| 7,729,555 | B1 | Jun. 01, 2010 | Chen, et al |
| 7,729,559 | B1 | Jun. 01, 2010 | O Ruanaidh, et al |
| 7,729,646 | B1 | Jun. 01, 2010 | Fujiwara, et al |
| 7,730,255 | B1 | Jun. 01, 2010 | Nagashima |
| 7,730,406 | B1 | Jun. 01, 2010 | Chen |
| 7,730,534 | B1 | Jun. 01, 2010 | Renkis |

| Foreign Patent Documents | | | |
|---|---|---|---|
| Foreign Doc. Nr. | Cntry Code | Kind Code | Pub. Dt |
| 48-10817 | JP | A | 1973-April |
| WO-9844739 | WO | A | 1998-October |
| WO99/07156 | WO | A | 1999-February |
| WO 00/13407 | WO | A | 2000-March |

-continued

| Foreign Patent Documents | | | |
|---|---|---|---|
| Foreign Doc. Nr. | Cntry Code | Kind Code | Pub. Dt |
| 2000227960 | JP | A | 2000-August |
| 1117251 | EP | B1 | 2001-July |
| WO-0158129 | WO | B1 | 2001-August |
| WO-03043348 | WO | B1 | 2003-May |

NONPATENT LITERATURE DOCUMENTS

Male Grooming Trends:Profiting in 2009 and Beyond. Datamonitor
HDTV Glossary. First Glimpse. June 2010 pp.17-18
Digital Imaging Glossary. First Glimpse. June 2010. pp. 24-36
Computing Glossary. First Glipse. June 2010. pp. 62
Rube: A Customized 2D and 3D Modeling Framework For Simulation. Paul Fishwick, Jinho Lee, Minho Park, Hyunju Shim. Department of Computer and Information Science and Engineering. University of Florida. 2003.
J. Higbie, 'The physics of the "Dyna Bee"', The Physics Teacher, 18, 147-148 91980)
P. G. Heyda, 'Roller ball dynamics', Mathmetics Today, 36, 9 (2000)
P. G. Heyda, 'Roller ball dynamics revisted', American Journal of Physics, 70, 1049-1051 (2002)
D. W. Gulick & O. M. O'Reilly, 'On the Dynamics of the Dynabee', ASME Journal of Applied Mechanics, 67, 321-325 (2000)
Marci Evans, 'Words on the Street-Hair Care' The Real Word. Memphis City School System. 2009
Richard C. Jaeger, Travis N. Blalock; Microelectronic circuit design, pp. 46-47, McGraw-Hill Professional 2003
John Sydney Blackemore, Solid state physics, pp. 1-3, Cambridge University Press, 1985
Sabrie Solomon, Sensors Handbook. pp. 18-28, McGraw-Hill Professional, 1998
Lawrence J. Kamen, Understanding electro-mechanical engineering, p. 174, John Wiley and Sons, 1995.

BRIEF SUMMARY OF THE INVENTION

This invention overcomes those and many other disadvantages by using a camera apparatus 1802 attached to the grooming tools body or hard wired FIG. 20 with integrated circuitry capable of capturing images of the targeted area the user desires to have groomed, and transmitting this visual information to a desired viewing apparatus for normal view 504, such as a preferred embodiment being a mobile device or television monitor for convenience as shown in FIG. 10. The user can use the modified camera apparatus to send visual images as snap shots or real time streaming feeds to a laptop 502 or other viewing device capable of receiving a transmission signal such as Wi-Fi, Bluetooth, DLNA, HDMI, electrical Ethernet adapter, coaxial cable, Cat45, Over-the-Air transmission, or USB cable. In an alternative embodiment, the camera 906 is hard wired FIG. 9 as part of the mobile device 204 enclosure or grooming device apparatus, and either the attached integrated circuit trimmer camera, or mobile device camera is capable of being operated using voice prompted operational commands. Alternatively, the camera device can be controlled using any relevant interface feature of the visual display devices. Once the targeted grooming area is captured by the camera device, the invention software superimposes an overlay of the preferred hair design style using an array of patterns to differentiate design grooming area cutting ques 802 the user wants as shown in FIG. 8. This combined image can be viewed using any of the aforementioned viewing devices, so the user can gauge the accuracy of their grooming the targeted area correctly.

BRIEF DESCRIPTION OF THE DRAWINGS

FIG. 12 is a rear view of the instructional hair design superimposed overlay patterns for grooming hair design guidance;

FIG. 13 is a sample grid used for the instructional hair design for guidance grooming tool's operational control, and user alerting training system;

REFERENCE NUMERALS

Figure 1:
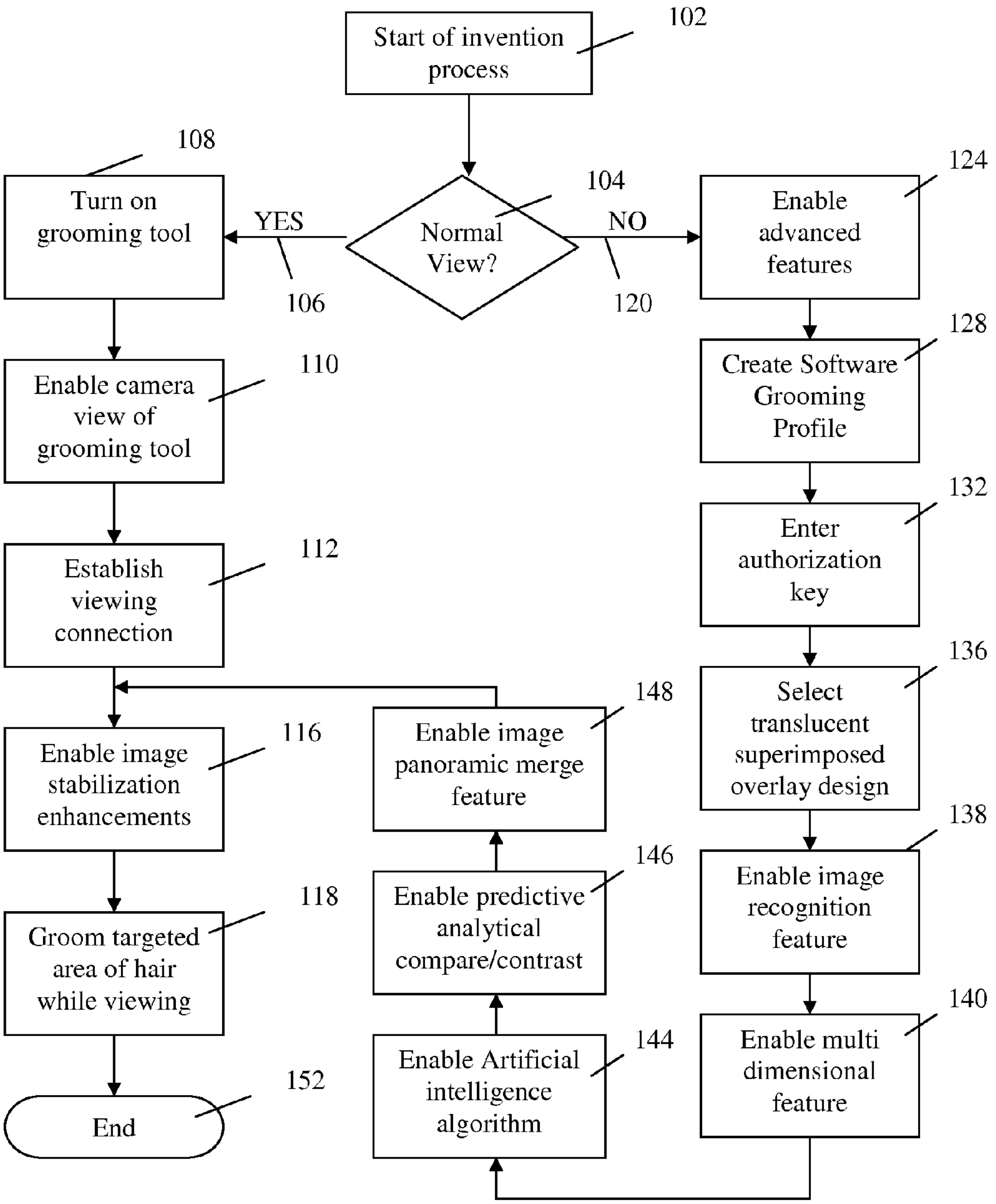
FIG. 1 is a process flow of preferred embodiment of the invention using normal view and advanced view optional features of the present method and system invention comprising an image capture device, video display device, and features such as image stabilization sensor software, grooming overlay layers, image processing, facial recognition, profile setup actions.
Figure 2:
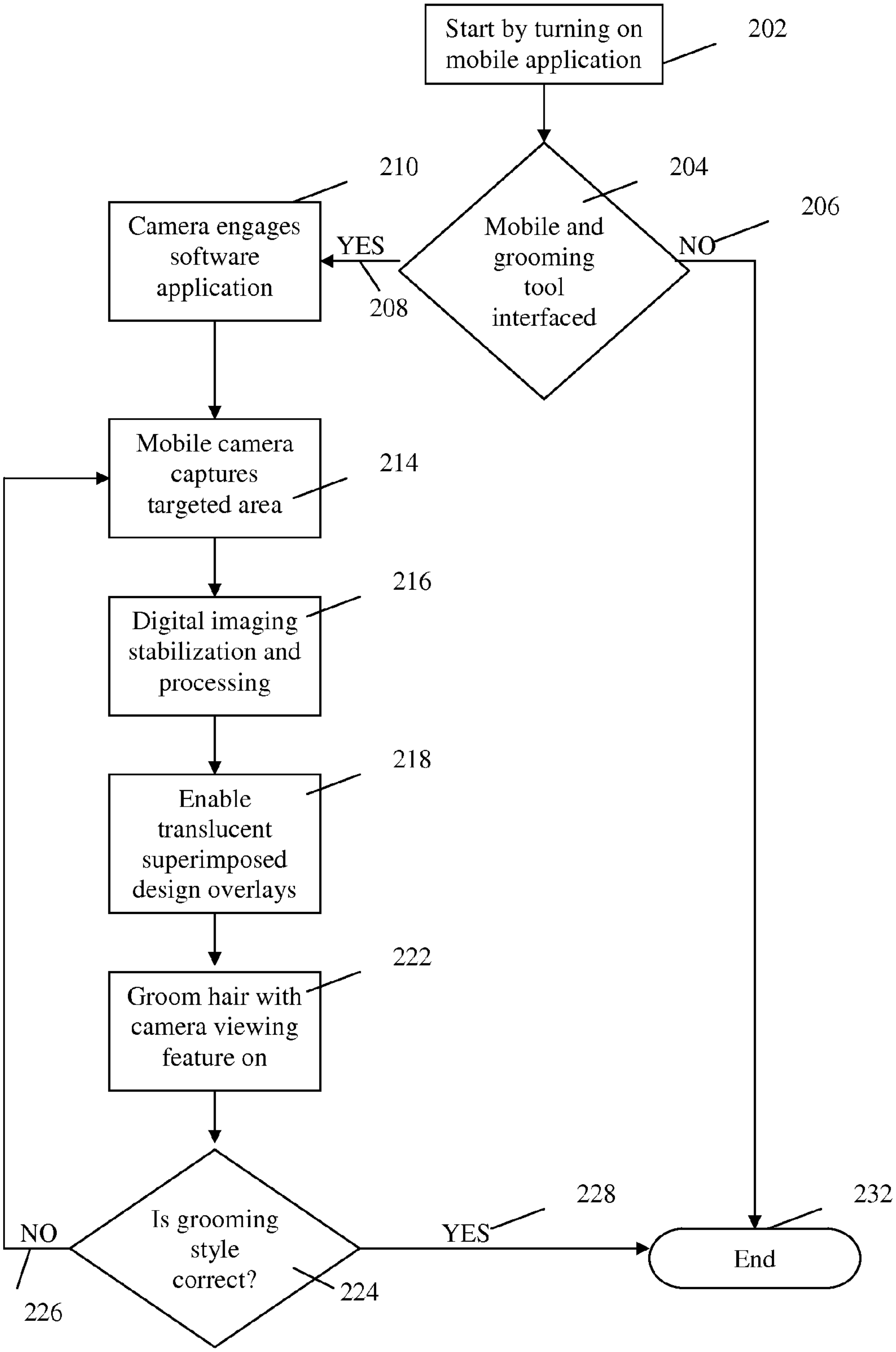
FIG. 2 is a process flow of alternative embodiment of the present invention using a mobile device image capture device for capturing targeted grooming area with invention system software comprising image processing system features software, image filtering, artificial intelligence, lighting and auto focus featured mobile application.
Figure 3:
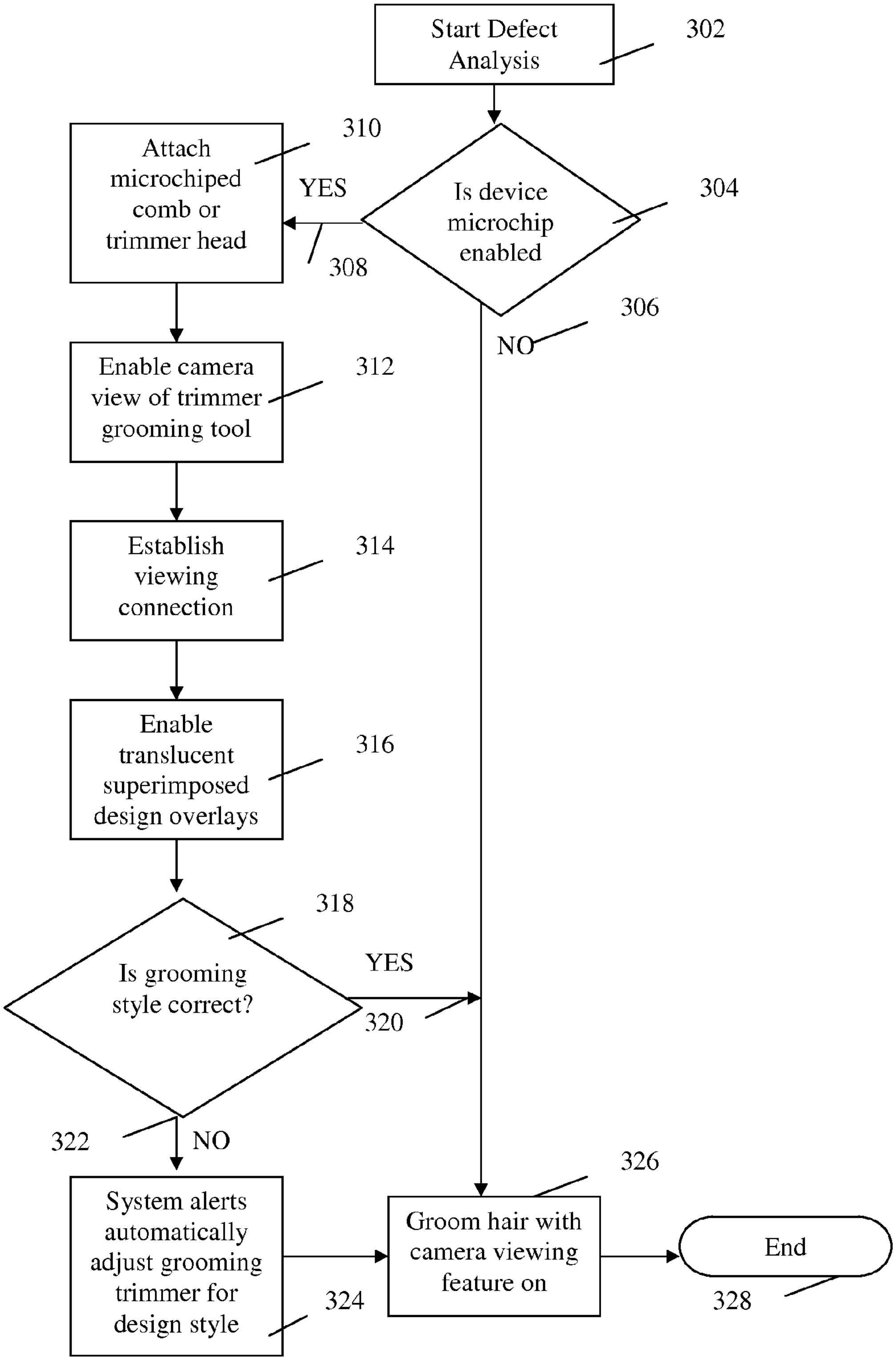
FIG. 3 is a process flow of an alternative embodiment of the present invention where the system and method uses microchips; thereby creating smart appliances, that automatically allow for control of the operational functions of invention preferred embodiment hair grooming trimmer tool apparatus.
Figure 4:
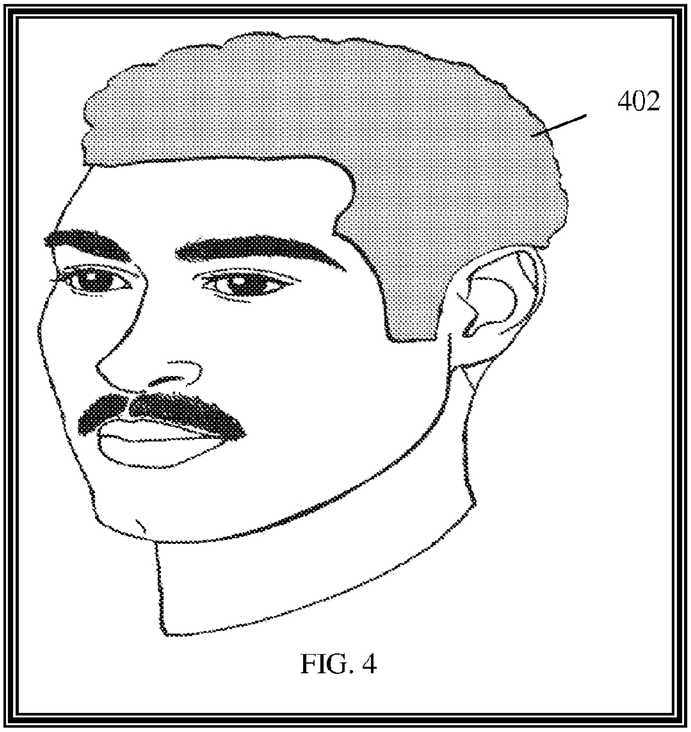
FIG. 4 is a front portrait view of a user looking in a mirror who needs hair groomed, and normally trying to self groom hair using mirrored angled views.
Figure 5:
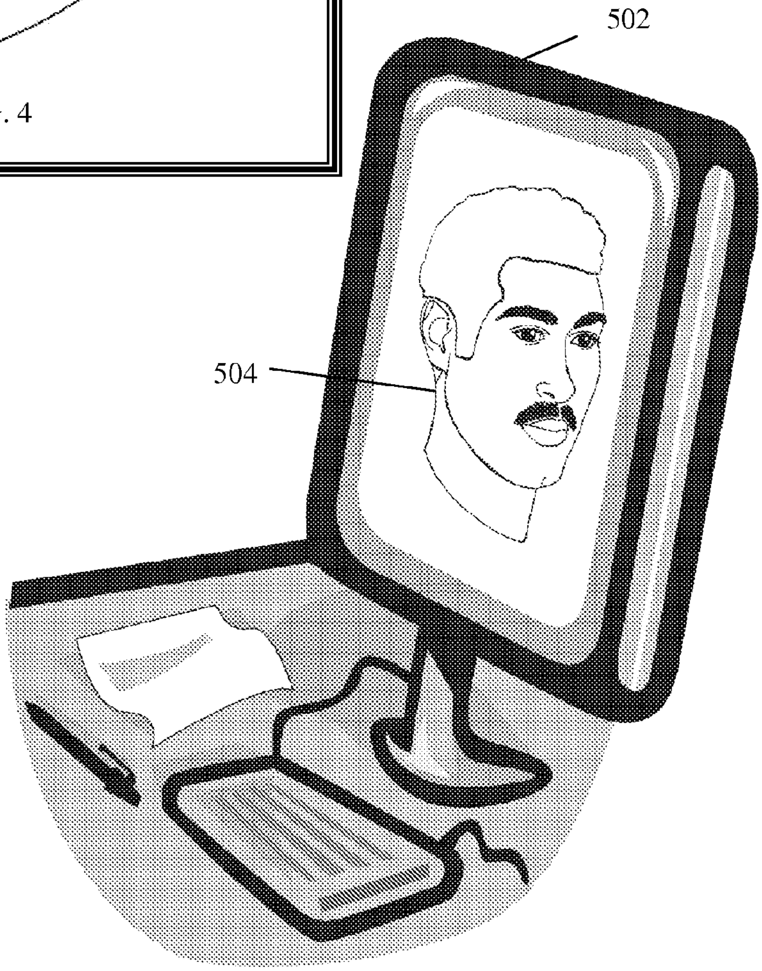
FIG. 5 is a front side view displayed on a computer monitor with system and method invention capturing image of hair in normal view for grooming hair to the preferred design style selection with the image captured being transmitted using Bluetooth, dlna streaming, multi-casting, electrical Ethernet adapter, coaxial cable, USB, CAT45, or wireless connection interface.
Figure 6:
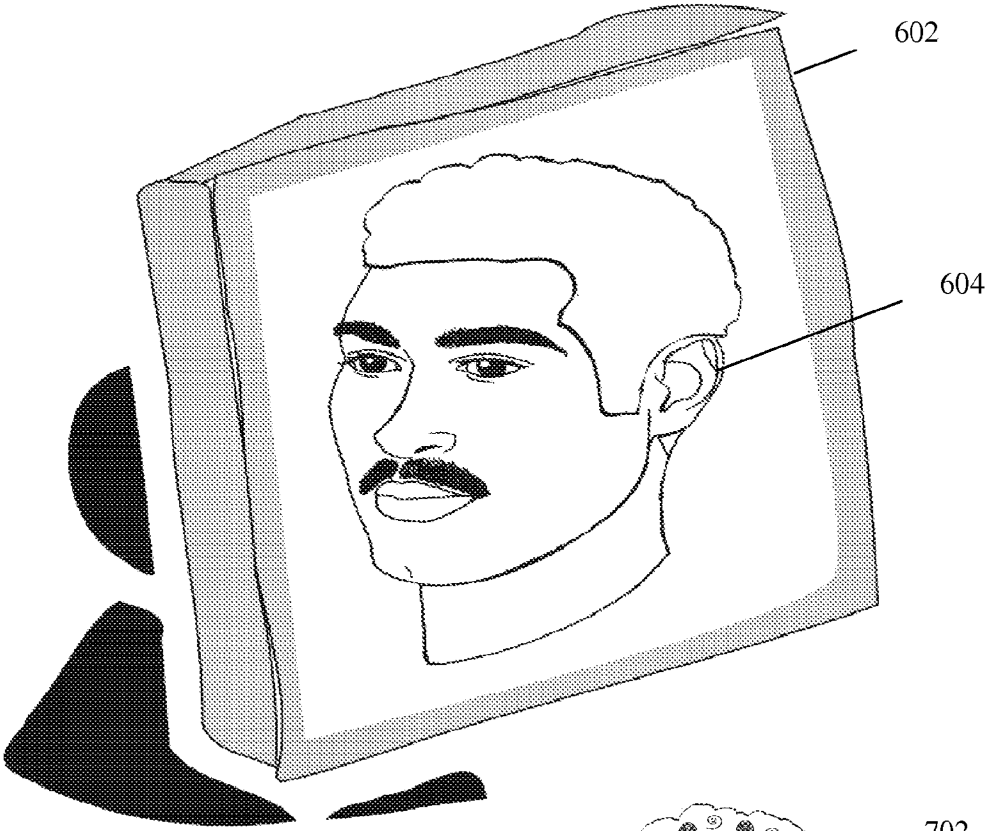
FIG. 6 is a front side view displayed on a television with the present system and method invention capturing image of hair in normal view for improved views for instructional design style selection with the image captured being transmitted using Bluetooth, RFID, dlna streaming, electrical Ethernet adapter, coaxial cable, USB, CAT45, or wireless connection interface.
Figure 7:
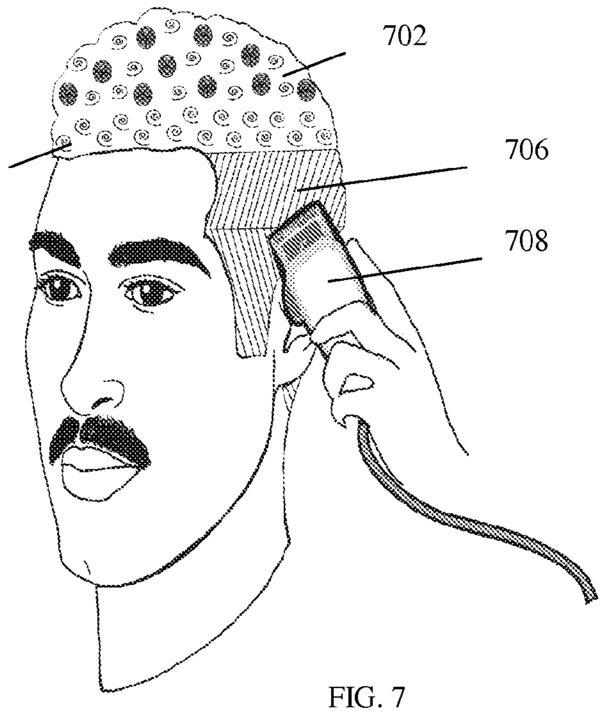
FIG. 7 is a front side view example of the present method and system invention and apparatus invention showing an example of advanced features such as superimposed overlays for grooming hair style guidance.
Figure 8:
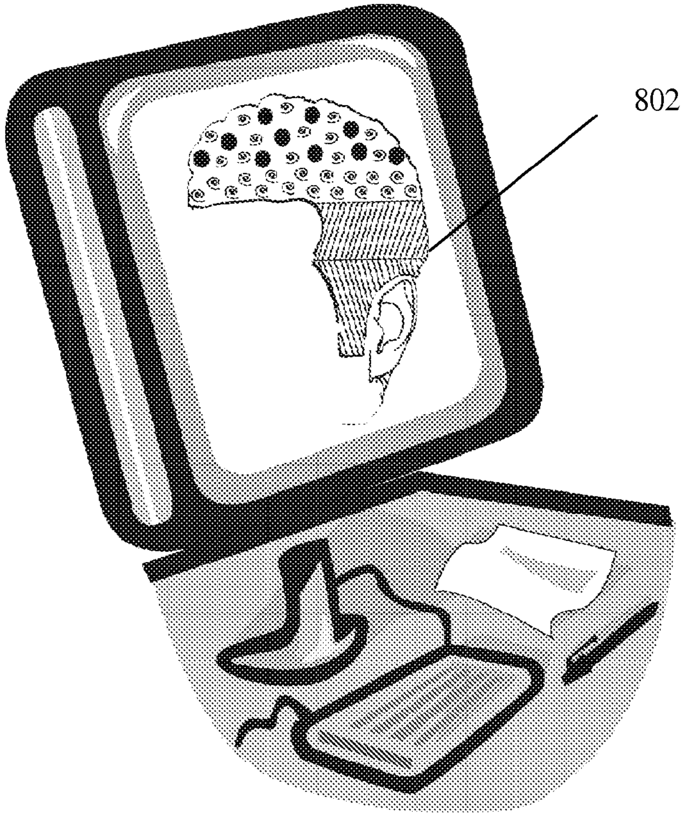
FIG. 8 is view of present invention system software used with a computer and monitor showing an example of advanced feature of superimposed overlays for grooming hair style guidance.
Figure 9:
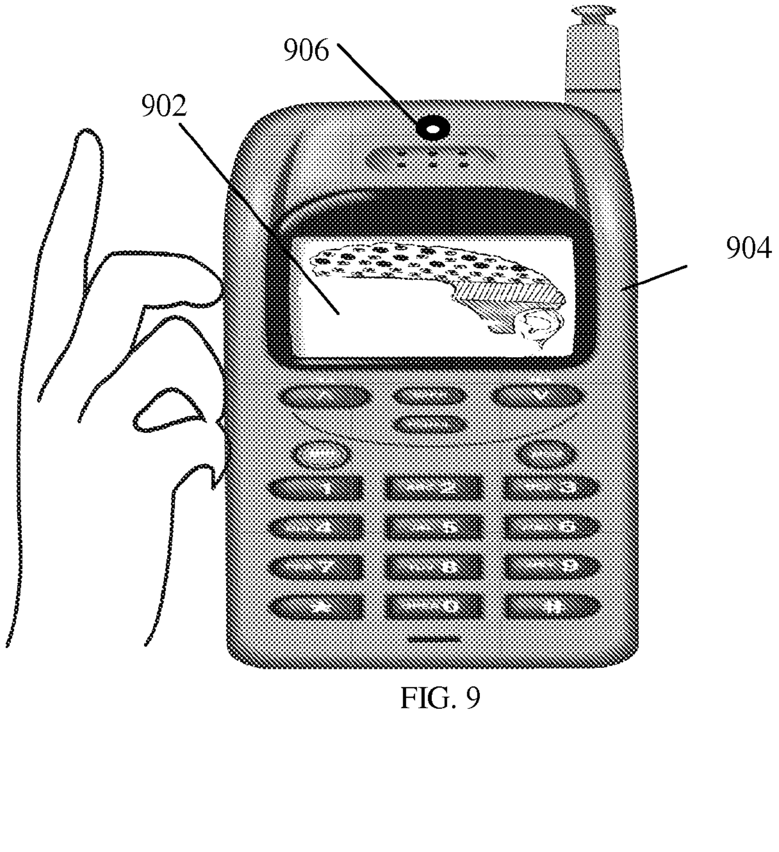
FIG. 9 is an example of the present invention software used with a mobile device using camera image capture feature of present invention with facial features masked out.
Figure 10:
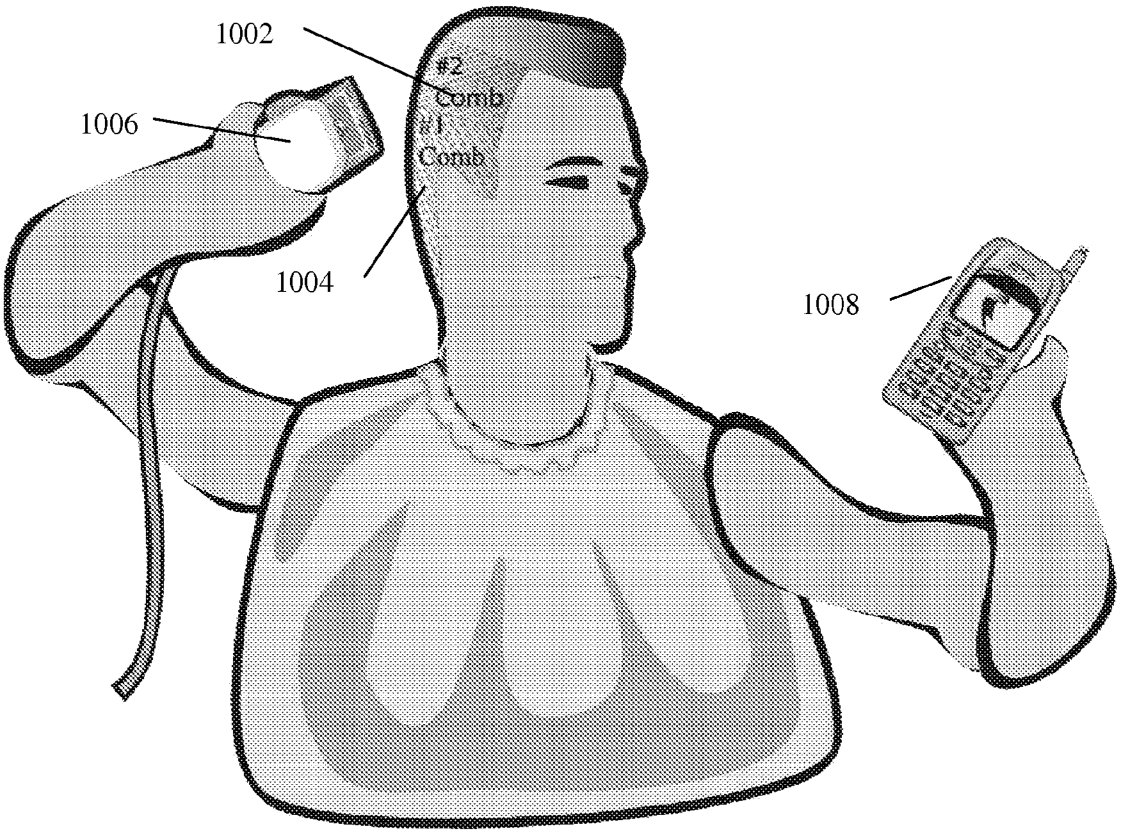
FIG. 10 is a front view of a user self grooming their hair with an example of the preferred embodiment of the present invention trimmer, camera, mobile device, and software aspects of the invention.

102—Start of the grooming process using the camera apparatus invention
104—normal view decision gate
106—affirmative to normal view using image capture device
108—turn on grooming tool
110—enable camera image capture device view of grooming tool
112—establish viewing connection with video display device
116—enable image stabilization enhancements
118—targeted area of hair while viewing using invention method, system and apparatus
120—negative to normal view using image capture device
124—enable advanced features
128—create software grooming profile
132—enter authorization key
136—select translucent superimposed overlay design
138—enable image recognition feature
140—enable multi dimensional feature
144—enable artificial intelligence algorithm software
146—enable predictive analytical compare and contrast feature
148—enable image panoramic merge feature
152—complete grooming hair
202—start by turning on mobile hair grooming application
204—mobile and grooming tool interface decision gate
206—negative decision application ends
208—affirmative enabling interface with grooming tool
210—camera engages software application
214—mobile camera captures targeted grooming area
216—digital imaging stabilization and image processing
218—enable translucent superimposed hair design overlays
222—groom hair with camera viewing feature on
224—Is grooming style correct decision gate
226—successful grooming results after defect compare and contrast analysis system
228—successful grooming results after defect compare and contrast analysis system
232—end of grooming process
302—workflow for automatic operational control of grooming tool by present invention
304—is device microchip enabled decision gate
306—negative to the device being microchip enabled
308—affirmative to the device being microchip enabled
310—attach microchiped comb or trimmer head
312—enabled camera view of trimmer grooming tool
314—establish viewing connection
316—enable translucent superimposed design overlays
318—is grooming style correct decision gate
320—successful grooming results after defect compare and contrast analysis system
322—unsuccessful grooming results after defect compare and contrast analysis system
324—system alerts automatically adjusting grooming trimmer for design style
326—groom hair with camera viewing feature on
328—end of grooming process
402—is a view of the user using a mirror in order to groom hair
502—is an example of the present invention's video display device computer and monitor
504—left side angular view of the present invention using the image capturing device
602—is an example of the present invention's video display device television
604—right angular side view of targeted grooming area of present invention
702—superimposed overlay higher area design patterns for atop the user's head
704—is a view of the superimposed overlay lower area design patterns
706—is the side view of tapered high fade with the superimposed overlay patterns
708—invention's image capturing device hard wired to electrical circuitry
802—present invention's video display device computer and monitor with design views
902—is a preferred embodiment of invention's mobile video display device design views
904—is an example of a mobile device capable of being used with the present invention
906—present invention's mobile image capturing device
1102—superimposed overlay system feature grid patterns for the high fade of head area
1104—superimposed overlay system feature grid patterns for the lower nape of neck area
1106—is a view of invention's image capturing device for grooming hair
1108—design overlay view of the present invention's mobile video display device
1102—is an example of an alternative embodiment of a curling iron hair grooming tool
1104—is an alternative embodiment example of the present invention using a curling iron
1202—is a rear view of a user's top third of present invention for grooming assistance
1204—is a rear view of a user's mid level of head showing superimposed overlay pattern

1206—is a rear view of a user's neck area of head showing superimposed overlay

1302—translucent superimposed overlay for instructional grooming training system

1304—superimposed design overlay of present invention's instructional guidance grid

1306—superimposed design overlay of present invention showing the grid training system

1308—grid diagram of the present invention instructional guidance of hair design style

1402—is a top view of a slide mechanism for engaging the depth level of inventions

1404—microchip for enabling the grooming device as a smart appliance apparatus

1502—is a top view of the rotary dial taper bladeset depth control of the inventions

1602—is a side view of the bladeset taper depth control arm of the present inventions

1702—is a front left top side example of prior art

1704—is a front left side example of prior art

1706—is a side view of the bladeset of prior art

1708—is a side rear view example of prior art

1710—is a front right side example of prior art

1802—is a front view of the image capturing device of the present inventions

1804—is a front view illustrating the angular shape of the present inventions embodiment

1902—is a rear view illustrating the angular shape of the present inventions embodiment

2002—is an side view of the present invention image capturing device's housing

2004—is a side view of the present invention image capturing devices lens

2102—preferred embodiment of invention hard wired with integrated circuitry

DETAILED DESCRIPTION OF THE INVENTION

Figure 19:
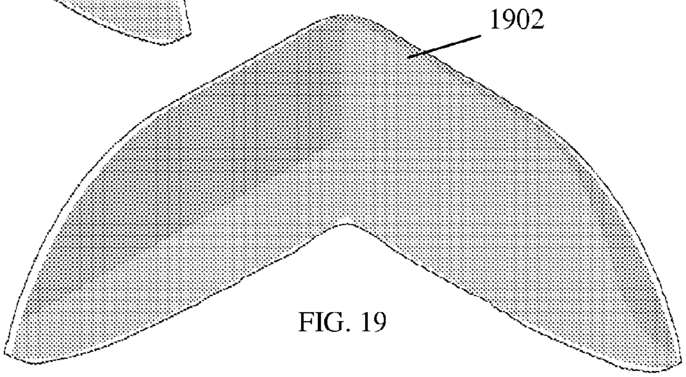
FIG. 19 is the rear view of an elongated camera attachment apparatus used with the present method and system invention's image capturing of device apparatus.
Figure 20:
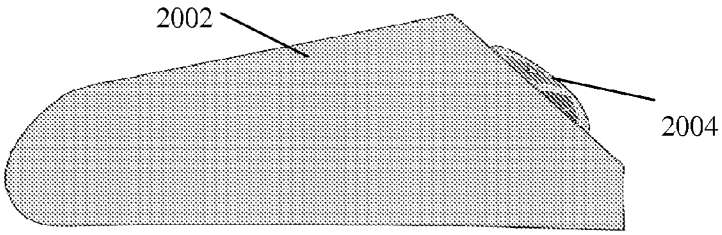
FIG. 20 is a larger profile side view of the hard wired electrical circuit integrated camera image capturing encasement apparatus interfaced with the present method and system invention.
Figure 21:
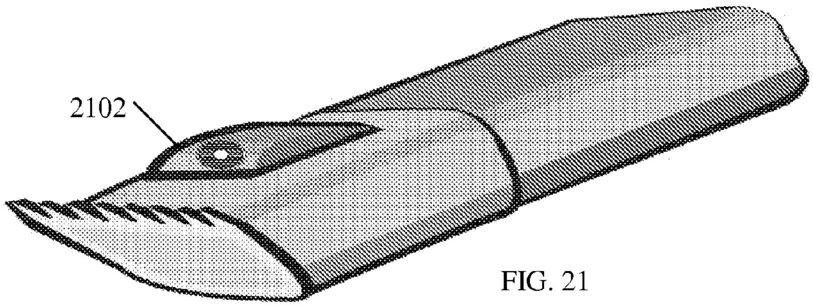
FIG. 21 is a smaller profile front side elongated view of a hard wired electrical circuit integrated camera image capturing encased in housing of trimmer grooming tool interfaced with the present method and system invention.

In the use of the 102 present invention, the use of an image capture device (ICD) 110 includes at least one sensor and one input component for detecting and recording images, a processor, a memory, a transmitter/receiver, and optionally, a hard wired 2101 electrical feed or rechargeable battery FIG. 19, having at least an indicator light for denoting camera activities, all constructed and configured in electronic connection interfaces for viewing targeted hair grooming area using the image capturing device invention as an attachment or hard wired FIG. 21 apparatus with the preferred embodiment hair grooming trimmer 222 tool with fixed or exchangeable cutting bladeset heads.

In a preferred embodiment of the present invention being a hair clipper having a microchip 310 hard wired within the trimmer's electrical circuitry, an image capture device interfaced with the artificial intelligence system, a trimmer comprising: a motor; a bladeset including a stationary blade and a moving blade configured for reciprocation relative to stationary blade have a microchip 1402 embedded in member, a trimmer having a microchip 1404 embedded within the bladeset comb module; a drive system configured for transferring motion from output shaft to bladeset, and including a driving member separately formed from moving blade and moving linearly along an axis transverse to a longitudinal axis of clipper; and the embodiment of the grooming apparatus' drive system includes a linear drive shaft and driving member is slidable relative to a chassis, ends of drive shaft are received in corresponding arms of chassis, drive system is configured so that the driving member reciprocates parallel to moving blade throughout a stroke of driving member; driving member being linearly slidable along an axis defined by linear drive shaft extending transverse to output shaft to provide linear motion of moving blade relative to stationary blade, allowing the ICD and the video display device (VDD) as the preferred embodiment of invention apparatus being a trimmer, portable personal grooming assistant, or robotics kiosk to be automatically controlled operationally during hair grooming.

In this alternative embodiment, a robotic grooming apparatus and system kiosk or portable grooming robotic system and device having one or more robotic mechanical systems; analyzing one or more electronic grooming portraits for presenting preprogrammed commands to the central processing unit in order to process the user's grooming selection. After which, a comparison between one layered image is compared with a subsequent image captured and processed to include a superimposed design overlay; activating the movement of robotic mechanical systems to groom users hair, with the mechanical system being controlled by an optical sensor processing grooming images based on the design overlay, thereby grooming the users hair.

Image acquisition refers to the taking of digital images of multiple views of the object of interest. In the processing step, the constituent images collected in the image acquisition step are selected and further processed to form an interactive sequence which allows for the interactive view of the object. Furthermore, during the Processing phase, the entire sequence is compressed. In the Storage and Caching Step, the resulting sequence is sent to a storage memory. In the Transmission and viewing step, a Viewer (user) may request a particular interactive sequence, for example, by selecting a particular image within a album of available captured files, which initiates the software system for grooming, checking of view, decompression and interactive rendering of the sequence on the end-users display device 112, which could be any one of a variety of devices, including a desktop PC, television, or a hand-held device using a variety of transmission methods such as electrical Ethernet adapter, DLNA, wireless, RF, USB, coaxial, streaming to name a few that those skilled in the art know the full scope of transmission options.

The system processing flow can be broken into four main phases:

1. Image Acquisition
2. Processing
3. Storage
4. Transmission and Viewing

For the preferred embodiments where the ICD includes a digital video camera (DVC) having a lens and corresponding camera components, the camera further includes a computer chip providing for capabilities of performing video compression within the ICD itself. The ICD as a wireless digital video camera is capable of capturing video within its range with an accompanying video display device (VDD) 602 as a still capture frame shot and/or compressing the captured video into a data stream in the form of a mobile device 204, television monitor, computer or display unit. In the case of video, the images are adjustable to capture at different sizes, different frame rates, multi-display of images, display system information, and combination thereof.

The VDDs of the present invention are capable of running software for managing input images from at least one wireless or wired ICD associated with or corresponding to a particular VDD device after software installation and initiation. The VDD device is programmable for wireless communication with image capture device, including both transmitting data, settings, controlling instructions and receiving input captured from the ICD, like images, video, audio, temperature, chemical presence, and the like Thus, the VDD device is capable of receiving wireless data from the wireless image capture device(s), indicating that the ICD is active, recording data and storing data, searching through recorded data, transmitting data and instructions to the ICD, adjusting ICD settings or controls, communicating with the present invention system software to send and receive data, and other functions, depending upon the specifications of the system setup.

The ICD further includes at least one microchip that makes the device an intelligent appliance, permitting functions to be performed by the ICD itself without requiring software installation onto the VDD, including but not limited to sensor and input controls, such as camera digital zoom, pan left and right, tilt up and down; image or video brightness, contrast, saturation, image stabilization and recognition, resolution, size, motion and audio detection settings, multi-view image display, recording settings, communication with other ICDs; and video compression. Other software-based functions capable of being performed by the VDD include sending text message, sending still image, sending email or other communication to a user on a remote communications device.

The user may select one of the "known persons" or may create a new "person" with an associated set of "profile" data in the image classification database. This database includes an appearance list for each of the "known persons" containing one or more identities and a table of face classes associated with each such identity. Multiple identities can be associated with each person because people typically change their appearance in daily life. Examples of such instances of varying appearance may be handling people with/without makeup; with/without beard or moustache or with different hair styles; with/without sunburn or tan; with/without glasses, hats, etc; and at different ages. In addition, there may be a chronological description where the faces progress over time which may manifest in changes in hairstyle, hair color or lack thereof, skin smoothness, etc. Within each face class is preferably grouped a set of similar faceprints which are associated with that face class for that person in order to groom user's hair based on a superimposed design style that is also selected. The database module may also access additional information on individual images, including image metadata, camera metadata, global image parameters, color dataset of information, etc., which may assist in categorization and search of images. If the user selects a "known identity", then if this new faceprint is sufficiently close to one of the face classes for that identity, it will be preferably added to that face class. Otherwise, in "manual" or "learning" mode the user may be shown a typical image representative of each face class and asked which face class the faceprint should be added to, or if they wish to create a new face class for that person. In "auto" mode, a new face class will be created by the workflow module for that identity.

A system for optical section imaging, comprising: a camera for recording a plurality of input images of an imaging surface; a grid using object geospatial positioning system; an optical sensor virtual lamp for shining light at the grid to project a grid pattern onto the imaging surface so that each of the input images includes a corresponding grid pattern at a corresponding angle; an actuator for shifting the grid between each input image recordation so that the grid patterns of at least two of the plurality of input images are at different phase angles; and a processor configured to: calculate, for each of the plurality of input images, the image's grid pattern angle; generate a first output image by calculating for each pixel of the first output image a value in accordance with a corresponding pixel value of each of the plurality of input images and the calculated angles; and generate a second output image by removing an object included in the first output image, wherein the object is removed one of: by (a): determining a contribution of the object to image intensity values of the first output image; and subtracting the contribution from the image intensity values; and by (b): applying an image transformation to the first output image to obtain transformation data; deleting a predetermined portion of a transformation image representing the transformation data, the transformation data being modified by the deletion of the predetermined portion; and generating a non-transformation superimposed 702 overlay image based on the modified transformation data while using artificial intelligence along with superimposed overlays for automatic operational control of grooming tool.

A computer-readable medium having stored thereon instructions adapted to be executed by a processor, the instructions which, when executed, cause the processor to perform an image generation method, the image generation method comprising: generating a first output image based on a plurality of input images; determining a contribution of an object to image intensity values of the first output image by determining values of a horizontal and a vertical direction; generating a second output superimposed 704 overlay image based on the first output image, the second output image being the same as the first output image less the object, including subtracting the contribution from the image intensity values, the subtraction including: determining values of the equation by plugging pixel area.

What is needed, therefore, is an inspection technique that is effective in locating pattern anomalies or defects in a single or a multi object image layer. The system by manual maneuver with user capturing an image of the plane(targeted positional point) and takes snapshot images and places them into a threaded connection interface (TCI) that with each passing snapshot a comparison of any changes or deltas occurs, through the central processing unit (cpu) and stores snapshots in a central memory storage; there in allowing for the placement of a selected superimposed design overlays by user upon users head for the intelligent interactive image views processing task. A method consistent with the invention may further include comparing, using an artificial intelligence engine 144, the received user-specific information with the accessed data, as illustrated. Comparing may include determining the appropriateness of pieces of the accessed data for the user based on the user-specific information using predictive analysis and artificial intelligence within the instructional training guidance system used with the superimposed overlays to accurately groom hair. "Artificial intelligence" is used herein to broadly describe any computationally intelligent training systems that combine knowledge, techniques, and methodologies. An AI engine may be any system configured to apply knowledge and that can adapt itself and learn to do better in changing environments. Thus, the AI engine may employ any one or combination of the following computational techniques: neural network, constraint program, fuzzy logic, classification, conventional artificial intelligence, symbolic manipulation, fuzzy set theory, evolutionary computation, cybernetics, data mining, approximate reasoning, derivative-free optimization, decision trees, or soft computing. Employing any computationally intelligent techniques, the AI engine may learn to adapt to unknown or changing environments for better performance when grooming hair apparatus is linked with the ICD, VDD, and using superimposed overlays. Thereby allowing the preferred embodiment of the present invention apparatus trimmer being automatically controlled for better operational management while grooming hair.

In an additional embodiment, the method may include comparing the potential defects of interest to the results generated by design rule checking performed on design pattern data of the object to determine if the defects of interest correlate to design rule checking (DRC) critical points of differentiation between the output images displayed on VDD. In one such embodiment, the method may also include removing from the inspection data the defects that do not correlate with the critical points based on groomed hair using the superimposed 706 overlay grid hair style design patterns. In a similar manner, the method may include comparing the potential defects of interest to the results generated by optical rule checking (ORC) performed on design pattern data of the object. In general, steps described herein involving the use of VDD results may alternatively be performed using ORC results. Each of the embodiments of the method described above may include any other step(s) described herein such as using a predictive analytical 146 compare and contrast 224 algorithm where the calculation of aerial view of image object pixels, color variation, etc in differing layers of superimposed 802 overlay image to the original image are compared for accuracy to the original grooming design for improved instructional guidance training using artificial intelligence.

A storage medium, comprising program instructions executable on a computer system to perform a computer-implemented method for sorting defects in a design pattern of an object, wherein the computer-implemented method comprises: searching for defects of interest in inspection data using priority information and defect attributes associated with individual defects in combination with one or more characteristics of a region proximate the individual defects and one or more characteristics of the individual defects, wherein the inspection data is generated by comparing images of the object to each other to detect the individual defects in the design pattern of the object, wherein the images that are compared 224 to each other are generated for different values of a superimposed 1104 overlay design variable, wherein the images comprise at least one reference image and at least one modulated image, and wherein the priority information is derived from a relationship between the individual defects and their corresponding modulation levels of the hair design variable; and assigning one or more identifiers to the defects of interest.

The overlay images may also be illustrated to the user in other manners. For example, the user interface may be configured to display any of the defects or just the sample images intermittently with reference images corresponding to the defect images. In this manner, the images may appear to highlight in the user video display device interface repeatedly one after the other. Such "highlighting" of the images may allow the user to gain additional understanding of the differences between the image layers. In a similar manner, sample images of differently modulated configurations may be highlighted in the user interface, which may aid in user understanding of trends of the defects historically so the user can use the compare and contrast analysis 224 for improved grooming.

The methods described herein may also include a number of other filtering or sorting functions. For example, the method may include comparing the defects of interest to inspection data generated by design rule checking (DRC) performed on design pattern data of the object layers to determine if the defects of interest correlate to DRC defects. In one such embodiment, the method may include removing from the inspection data the DRC defects that do not correlate with the defects of interest within the targeted grooming plane area. DRC could be a lenient based on male pattern baldness, hair bumps, receding hairline, or other source layer imperfections.

The present invention generally relates to computer-implemented methods for detecting and sorting defects in a design pattern of an object. Certain embodiments relate to a computer-implemented method that includes generating a composite reference image from two or more reference images and using the composite reference image for comparison with other sample images for defect detection. Interfaced with the AI engine, the multiple grid reference point positions and corresponding images may be used in order to generate an output image based on images corresponding to grid angles are the basis for the present invention method, system and apparatus grooming solution being used to accurately groom a user's hair based on the display views and superimposed overlay designs.

An imaging apparatus, comprising: a camera 906 for recording a plurality of input images; and a processor configured to: generate a first output image based on the plurality of input images; and remove an object from the first output image to generate a second output image; wherein, for the generation of the second output image, the processor is configured to: apply an image transformation in the form of a superimposed overlay grooming hair design style in correlation to the first output image to obtain transmitted transformation data; delete a predetermined portion of a transform image representing the transform data 902 the transmitted transformed image data being modified by the deletion of the predetermined portion; and generate a non-transform image based on the modified transform data 802 embodied within the translucent superimposed overlay area 136. Furthermore, it will be appreciated that the camera 110 may transmit each image after its recordation or may otherwise transmit them in a single batch transfer. An imaging apparatus, comprising: a camera for recording a plurality of input images; and a processor configured to: generate a first output image based on the plurality of input images; determine a contribution of an object to image intensity values of the first output image by determining values of variation in one of a horizontal and a vertical direction wherein the imaging apparatus 708, wherein the processor is configured to: determine a tilt of the superimposed 802 overlay grooming grid pattern for image stabilization 116 with respect to an imaging area of the at least one of the input images; rotate the transmitted image at least one of the input images to negate the tilt for proper orientation; for the software interfaced with the processor aligns the image captured by the ICD to maintain proper orientation using sensors for image pixel analysis.

The processor may take various forms, including a personal computer system, mainframe computer system, workstation, network appliance, Internet appliance, personal digital assistant ("PDA"), smart phone 1008, television system or other processor enabled device. In general, the term "computer system" may be broadly defined to encompass any device having one or more processors, which executes instructions from a memory medium. In addition, the processor may include a processor as described here within incorporated by reference above, which are particularly suitable for handling a relatively large amount of image data substantially simultaneously.

Consistent with the imaging invention to determine the current health status of a viewable plan area for suggesting beauty products, an alternative embodiment of the imaging device, being a system, method, and apparatus that includes identifying, using a scanner machine or mobile imaging device ; embodied as a stand alone desk top unit or part of a multi-functional device; wherein device allows for user to scan retail receipts into an optical character reading (OCR) system interfaced with an interactive marketing system; comprising a cpu, database, storage, and using predictive analytics for matching promotional products based on the purchase product information read from the receipt. Additionally, the system can send promotional coupons in digital form to a users mobile device using sms text messaging. Alternatively, the system can send promotional product coupons to a users online profile for loading digital coupons on mobile device memory; digital coupons placed on a stored value card or credit card; or coupon offers sent to users home address. In an alternative example embodiment of the present invention, the use of a mobile device having an image capture scanning device interfaced to a processor with OCR system capable of capturing the retail receipt to initiate the promotional product coupon being sent to user's mobile device for loading onto a devices memory and associated profile account.

Furthermore; for removal of an object area from an optical sectioning output image in an alternative example embodiment of the present invention, the system and method may remove a section of an image representing image transform data of the output image that is at a predetermined location of the transform image, i.e., a portion of the image transform data that forms the portion of the transform image that is at the predetermined location may be removed.

Embodiments of the present invention relate to an apparatus, computer system, and method for generating an image via optical sectioning by determining angles of a grid pattern projected successively onto an object to be imaged for guidance of customized grooming hair style designs using superimposed overlays.

In an alternative embodiment, the processor 502 may cause the camera to record a single set of images of an object having a substantially uniform surface to determine the trimmer 708 grooming tool angles of the images caused by movement of the grooming grid 136. The processor 502 may save the determined trimmer angles in a memory 312.

Alternatively, if the object to be imaged has a uniform surface or includes substantial detail so that substantial data may be obtained from an image of the object, the processor 108 may determine the optimum image trimmer angles from images of the object to be imaged, without previous imaging of another object that is inserted into the camera's line of sight solely for determining image grooming tool angles. Additionally in the present invention system and method, image and video analytics data is automatically sent to the invention system application.

The program instructions may be implemented in any of various ways, including procedure-based techniques, component-based techniques, and object-oriented techniques, among others. For example, the program instructions may be implemented using Matlab, Visual Basic, ActiveX controls, C, C++ objects, C#, JavaBeans, Microsoft Foundation Classes ("MFC"), or other technologies or methodologies, as desired.

Program instructions implementing methods such as those described herein may be transmitted over or stored on the carrier medium. The carrier medium may be a transmission medium such as a wire, cable, or wireless transmission link, or a signal traveling along such a wire, cable, or link. The carrier medium may also be a storage medium such as a read-only memory, a random access memory, a magnetic or optical disk, or a magnetic tape.

In this inventions preferred embodiment, the trimmer 708 including a housing and where ICD is enclosed within a portion of housing disposed topside of trimmer directly adjacent moving blade of bladeset in a fixed position relative to moving blade and defining a flow path for cut hair for capturing images of cut hair away in targeted grooming area using the present invention's image recognition 138 software system.

A method for automatic identification of a hair region, comprising the steps of: identifying edges from an original image which includes face and hair regions; storing a direction and length of the lines which form each edge; searching a line bundle in which lines of a same direction are gathered; establishing a color of the line bundle as a hair color; performing line tracing to identify lines having connections to the line bundle and having the hair color; and establishing pixels on the identified lines as the hair region, and applying a superimposed overlay grooming pattern for hair design.

The invention provides an improved virtual image viewing and panning system. In this system part of a panoramic 148 image is represented in a detailed image, the location of which is shown in an improved map image visible on a VDD. It is much easier for the user to understand direction with trailing directional arrows without any prior knowledge of the physical location of the panoramic 148 image. The detailed image and the map image are never out of sync because any change in the detailed image is immediately reflected in the grid mapping image thereto, and any change in the map image is immediately reflected in the detailed image.

A system and method for displaying 3D 140 data are presented. The method involves transforming a 2D image converting image into a 3D display for grooming hair with the 3D display region divided into two or more display subregions, and assigning a set of display rules to each display subregion.

A skin sensor system, comprising an optical sensor housed within the invention that uses a processor to separate the hair area from the skin indicating the distance distinctly measured between the two objects; reporting to invention system aligned with grooming design guide for improved grooming A method of digital image processing using face detection for achieving a desired spatial parameter, comprising: (a) identifying a group of pixels that correspond to a face within a main digital image; (b) generating in-camera, capturing or otherwise obtaining in-camera a collection of one or more images including rendering face viewed on VDD; (c) tracking face within collection of one or more captured images using ICD; (d) identifying one or more sub-groups of pixels that correspond to one or more facial features of the face, identifying of group or sub-groups of pixels, or both, being based on the tracking of face within collection of one or more images; (e) determining initial values of one or more parameters of pixels of the one or more sub-groups of pixels; (f) determining an initial spatial parameter of the face within the main digital image based on the initial values; (g) determining adjusted values of pixels within the digital image for adjusting the main digital image based on a comparison of the initial and desired spatial parameters; (h) generating an adjusted version of the digital image including adjusted values of pixels; (i) storing, displacing, transmitting, transferring, printing, uploading or downloading the adjusted version of the digital image, or a further processed version, or combinations thereof, and (j) automatically retrieving stored grooming profile from storage memory with last superimposed overlay design for grooming hair populated.

A user may apply a particular angle of axis for the trimmer or bladeset relative to the targeted grooming plane area of the head, either using a substantially right or left angle to the hair to be trimmed while holding the trimmer in either hand by means of rotating the blade assembly to a preferred position, apart as discussed above. One of these positions of the blade assembly is suitable for use in the right hand, and the other position is suitable for use in the left hand. A user may use the trimmer to trim hair on one side of the head with the blade assembly rotated to one position, then rotate the blade assembly to the other position, grasp the trimmer with the other hand, then trim hair on the other side of the head while using the ICD and VDD for accurate grooming. In either hand, the bladeset is positionable at the angle of attack. Hair on the back of the self-user's head may be trimmed with the trimmer, having a hard wired FIG. 21 electrical connection or rechargeable battery, and held in either hand while viewing the transmitted image from the ICD, and with the blade assembly rotated to the appropriate position for the hand chosen based on the present inventions method and system inventions superimposed overlay hair design style. The trimmer is even configured such that, if necessary, it may be held in a single hand and, with the blade assembly rotated to one or the other of the preferred positions, hair on either side or on the back of the head may be trimmed with the angle of attack of the trimmer or bladeset relative to the head substantially a right angle to the hair to be trimmed. Regardless of the rotated position of the bladeset, the configuration of the teeth is such that the trimmer may be repeatedly passed through the hair in a brushing action without creating sharply defined "swaths" in the hair, while using image stabilization 116 to control orientation and vibration of ICD such as not to negatively affect the image being transmitted to the VDD.

The present invention relates generally to hair cutting devices having a bladeset including a moving blade reciprocating relative to a stationary blade and a drive system for powering the bladeset, and more specifically to hair clippers or trimmers used for cutting hair of humans or animals. However, those skilled in the art would be aware that the scope of this present invention could also be applied to other areas such as tree and lawn trimming, art painting or the like.

Figure 11:
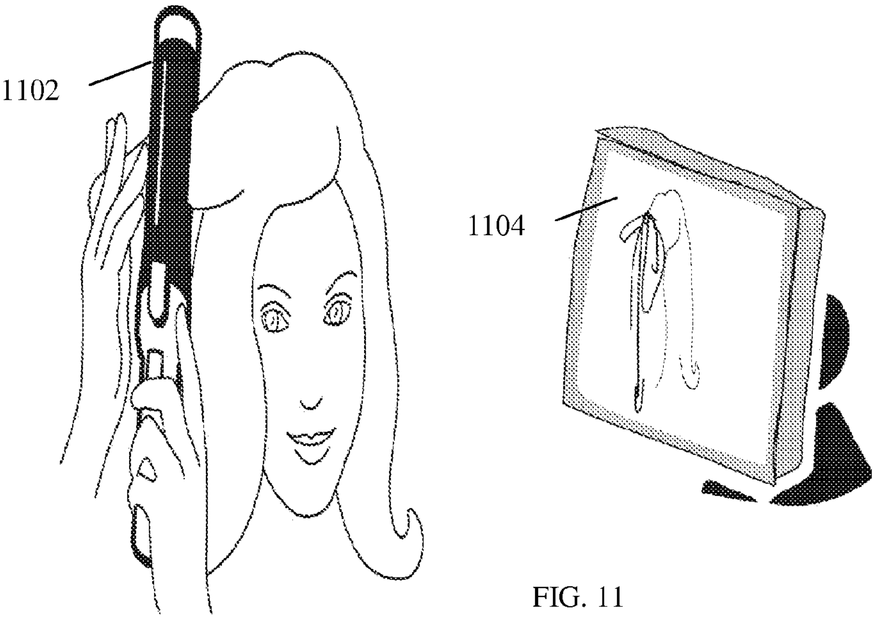
FIG. 11 is an alternative embodiment example of a grooming tool being used with the present method and system invention interfaced with curling iron grooming tool and television display device.
Figure 14:
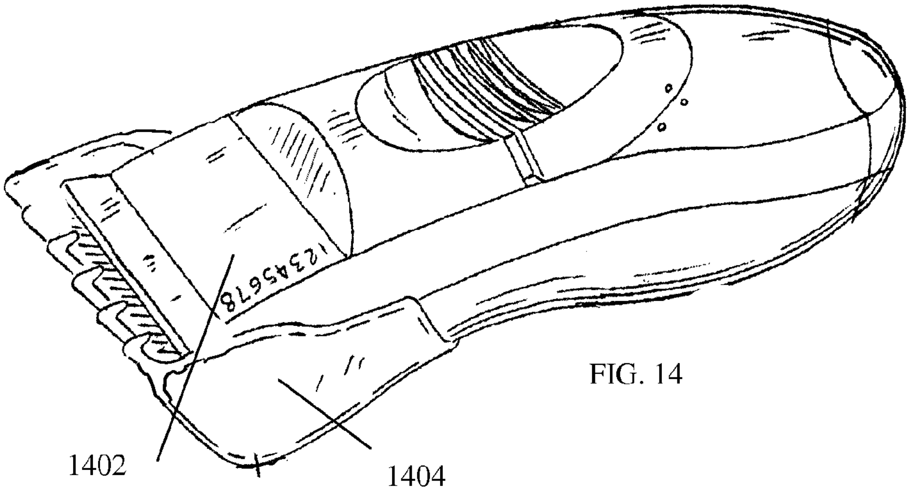
FIG. 14 is a top side view of a trimmer having a slide taper depth switch for bladeset depth control for use with the present method and system invention for automatic operational control of invention apparatus being microchip enabled.
Figure 15:
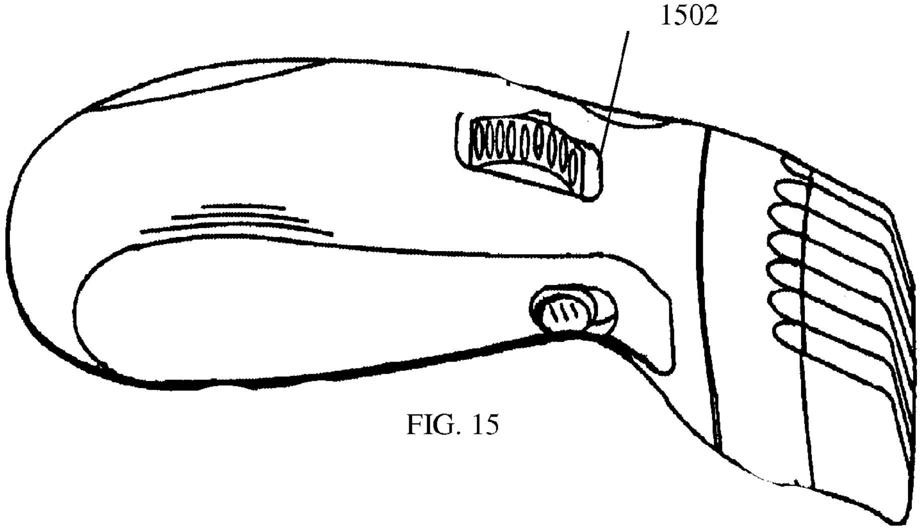
FIG. 15 is a top side view of a trimmer having a rotary dial for bladeset depth control for use with the present method and system invention for automatic operational control of invention apparatus being microchip enabled.
Figure 16:
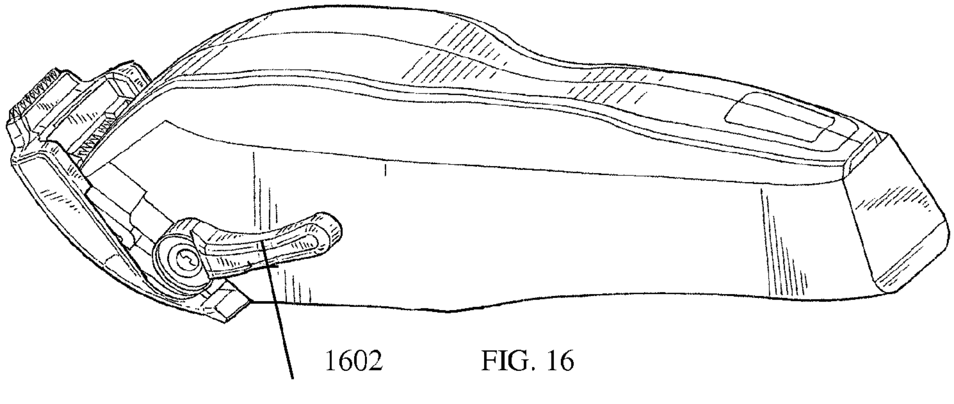
FIG. 16 is a side view of a clipper with elongated blade taper depth control arm for bladeset depth control for use with the present method and system invention for automatic operational control of invention apparatus being microchip enabled.
Figure 17:
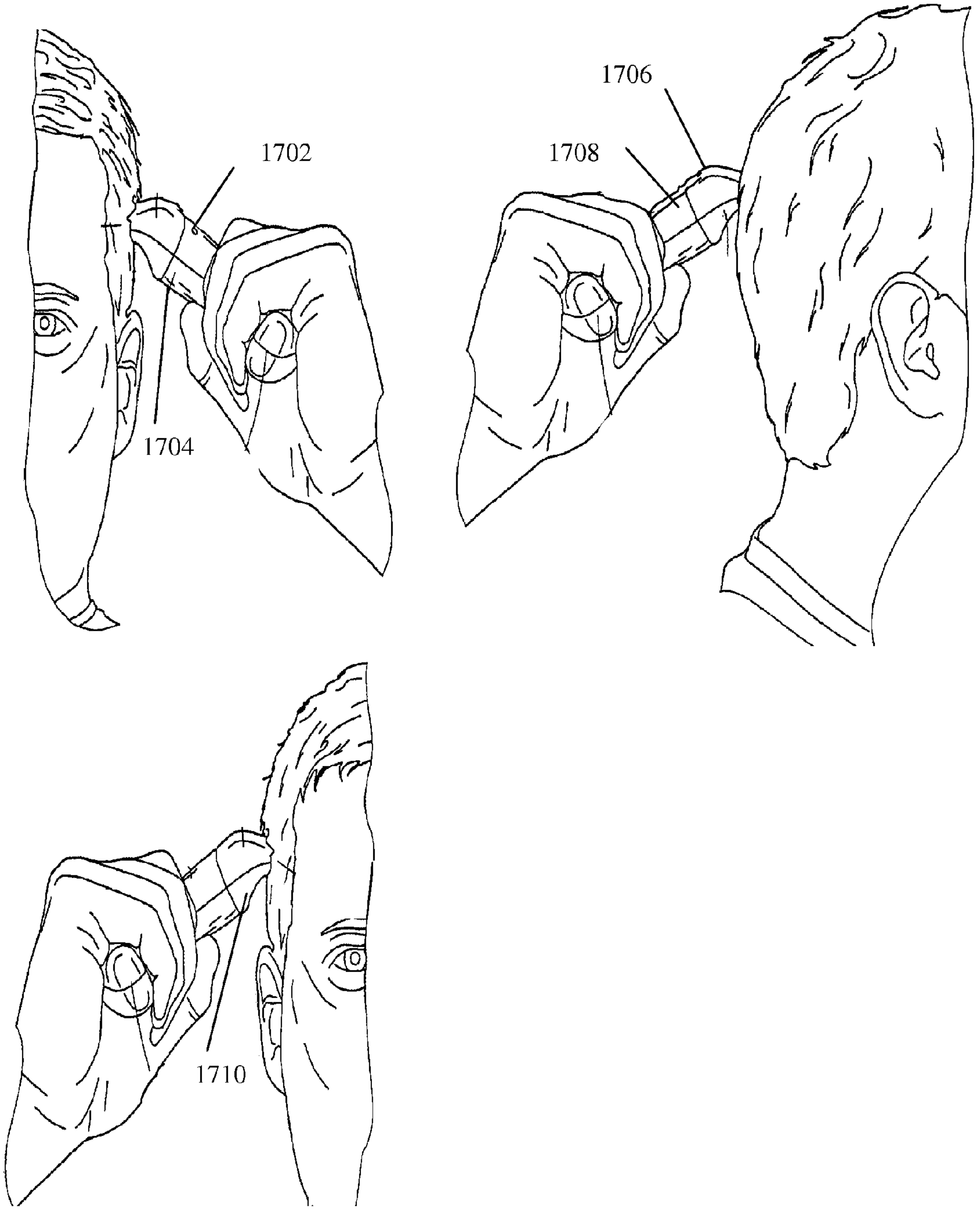
PRIOR ART FIG. 17
FIG. 17 is mixed view of prior art illustrating a trimmers use to allow self grooming of hair.
Figure 18:
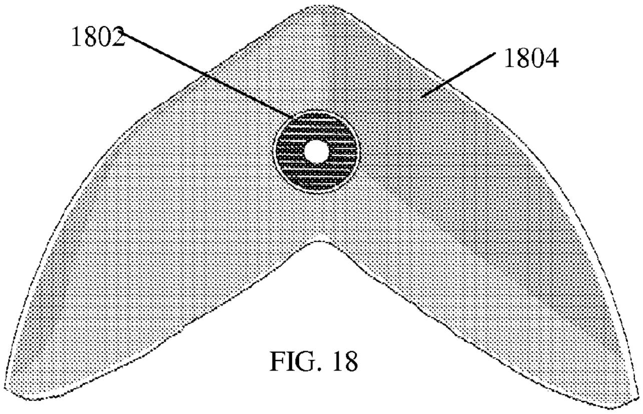
FIG. 18 is the front view of an elongated attachment apparatus used with the present method and system invention's image capturing of device apparatus.

Furthermore, those skilled in the art will recognize the scope of the present invention can be used with other grooming tools FIG. 11 such as shavers, razors, hair clippers, curling iron 1102, blow dryer, flat iron, hair straightner, styling iron, ionic dryer, ceramic grooming apparatus and the like.

Based on the above disclosure various aspects of the invention are realized. The following paragraphs will illustrate numerous exemplary embodiments.

A skin sensor system, comprising an optical sensor housed within the invention that uses a processor to separate the hair area from the skin indicating the distance distinctly measured between the two objects; reporting to invention system aligned with grooming design guide for improved grooming.

A method of digital image processing using face detection for achieving a desired spatial parameter, comprising: (a) identifying a group of pixels that correspond to a face within a main digital image; (b) generating in-camera, capturing or otherwise obtaining in-camera a collection of one or more images including rendering face viewed on VDD; (c) tracking face within collection of one or more captured images using ICD and automatically retrieving stored grooming profile from storage memory with last superimposed overlay design for grooming hair populated.

An Image acquisition apparatus refers to the taking of digital images of multiple views of the object of interest. In the processing step, the constituent images collected in the image acquisition step are selected and further processed to form an interactive sequence which allows for the interactive view of the object. Furthermore, during the Processing phase, the entire sequence is compressed and interactive rendering of the sequence on the end-users display device, which could be any one of a variety of devices, including a desktop PC, television, or a hand-held device using a variety of transmission methods such as electrical Ethernet adapter, DLNA, wireless, RF, USB, coaxial, streaming to name a few that those skilled in the art know the full scope of transmission options.

A hair clipper having a microchip hard wired within the trimmer's electrical circuitry, an image capture device interfaced with the artificial intelligence system, a trimmer comprising: a motor; a bladeset including a stationary blade and a moving blade configured for reciprocation relative to stationary blade have a microchip embedded in member, a trimmer having a microchip embedded within the bladeset comb module; a drive system configured for transferring motion from output shaft to bladeset, and including a driving member separately formed from moving blade and moving linearly along an axis transverse to a longitudinal axis of clipper; and the embodiment of the grooming apparatus' drive system includes a linear drive shaft and driving member is slidable relative to a chassis, ends of drive shaft are received in corresponding arms of chassis, drive system is configured so that the driving member reciprocates parallel to moving blade throughout a stroke of driving member; driving member being linearly slidable along an axis defined by linear drive shaft extending transverse to output shaft to provide linear motion of moving blade relative to stationary blade, allowing the image capture device (ICD) and the video display device as the preferred embodiment of invention apparatus being a trimmer, portable personal grooming assistant, or robotics kiosk to be automatically controlled operationally during hair grooming.

A robotic grooming apparatus and system kiosk or portable grooming robotic system and device having one or more robotic mechanical systems; analyzing one or more electronic grooming portraits for presenting preprogrammed commands to the central processing unit in order to process the user's grooming selection. Comprising of a comparison between one layered image is compared with a subsequent image captured and processed to include a superimposed design overlay; activating the movement of robotic mechanical systems to groom users hair, with the mechanical system being controlled by an optical sensor processing grooming images based on the design overlay, thereby grooming the users hair.

An image capture device includes a digital video camera (DVC) having a lens and corresponding camera components, the camera further includes a computer chip providing for capabilities of performing video compression within the ICD itself. The ICD as a wireless digital video camera is capable of capturing video within its range with an accompanying video display device (VDD) as a still capture frame shot and/or compressing the captured video into a data stream in the form of a mobile device, television monitor, computer or display unit. In the case of video, the images are adjustable to capture at different sizes, different frame rates, multi-display of images, display system information, and combination thereof.

An ICD further includes at least one microchip that makes the device an intelligent appliance, permitting functions to be performed by the ICD itself without requiring software installation onto the VDD, including but not limited to sensor and input controls, such as camera digital zoom, pan left and right, tilt up and down; image or video brightness, contrast, saturation, image stabilization and recognition, resolution, size, motion and audio detection settings, multi-view image display, recording settings, communication with other ICDs; and video compression. Other software-based functions capable of being performed by the VDD include sending text message, sending still image, sending email or other communication to a user on a remote communications device.

A video display device (VDD) of the present invention are capable of running software for managing input images from at least one wireless or wired ICD associated with or corresponding to a particular VDD device after software installation and initiation. The VDD device is programmable for wireless communication with image capture device, including both transmitting data, settings, controlling instructions and receiving input captured from the ICD, like images, video, audio, temperature, chemical presence, and the like A system capturing an associated set of "profile" data in the image classification database. This database includes an appearance list for each of the "known persons" containing one or more identities and a table of face classes associated with each such identity. Multiple identities can be associated with each person because people typically change their appearance in daily life. Examples of such instances of varying appearance may be handling people with/without make-up; with/without beard or moustache or with different hair styles; with/without sunburn or tan; with/without glasses, hats, etc; and at different ages. In addition, there may be a chronological description where the faces progress over time which may manifest in changes in hairstyle, hair color or lack thereof, skin smoothness, etc. Within each face class is preferably grouped a set of similar faceprints which are associated with that face class for that person in order to groom user's hair based on a superimposed design style that is also selected. The database module may also access additional information on individual images, including image metadata, camera metadata, global image parameters, color dataset of information, etc., which may assist in categorization and search of images. If the user selects a "known identity", then if this new faceprint is sufficiently close to one of the face classes for that identity.

A system for optical section imaging, comprising: a camera for recording a plurality of input images of an imaging surface; a grid using object geospatial positioning system; an optical sensor virtual lamp for shining light at the grid to project a grid pattern onto the imaging surface so that each of the input images includes a corresponding grid pattern at a corresponding angle; an actuator for shifting the grid between each input image recordation so that the grid patterns of at least two of the plurality of input images are at different phase angles; and a processor configured to: calculate, for each of the plurality of input images, the image's grid pattern angle; generate a first output image by calculating for each pixel of the first output image a value in accordance with a corresponding pixel value of each of the plurality of input images and the calculated angles; and generate a second output image by removing an object included in the first output image, wherein the object is removed one of: by (a): determining a contribution of the object to image intensity values of the first output image; and subtracting the contribution from the image intensity values; and by (b): applying an image transformation to the first output image to obtain transformation data; deleting a predetermined portion of a transformation image representing the transformation data, the transformation data being modified by the deletion of the predetermined portion; and generating a non-transformation superimposed overlay image based on the modified transformation data while using artificial intelligence along with superimposed overlays for automatic operational control of grooming tool.

A computer-readable medium having stored thereon instructions adapted to be executed by a processor, the instructions which, when executed, cause the processor to perform an image generation method, the image generation method comprising: generating a first output image based on a plurality of input images; determining a contribution of an object to image intensity values of the first output image by determining values of a horizontal and a vertical direction; generating a second output superimposed overlay image based on the first output image, the second output image being the same as the first output image less the object, including subtracting the contribution from the image intensity values, the subtraction including: determining values of the equation by plugging pixel area.

An inspection technique that is effective in locating pattern anomalies or defects in a single or a multi object image layer. The system by manual maneuver with user capturing an image of the plane(targeted positional point) and takes snapshot images and places them into a threaded connection interface (TCI) that with each passing snapshot a comparison of any changes or deltas occurs, through the central processing unit (cpu) and stores snapshots in a central memory storage; there in allowing for the placement of a selected superimposed design overlays by user upon users ead for the intelligent interactive image views processing task. A method consistent with the invention may further include comparing, using an artificial intelligence engine, the received user-specific information with the accessed data, as illustrated. Comparing may include determining the appropriateness of pieces of the accessed data for the user based on the user-specific information using predictive analysis and artificial intelligence within the instructional training guidance system used with the superimposed overlays to accurately groom hair.

An AI engine may be any system configured to apply knowledge and that can adapt itself and learn to do better in changing environments. Thus, the AI engine may employ any one or combination of the following computational techniques: neural network, constraint program, fuzzy logic, classification, conventional artificial intelligence, symbolic manipulation, fuzzy set theory, evolutionary computation, cybernetics, data mining, approximate reasoning, derivative-free optimization, decision trees, or soft computing. Employing any computationally intelligent techniques, the AI engine may learn to adapt to unknown or changing environments for better performance when grooming hair apparatus is linked with the ICD, VDD, and using superimposed overlays. Thereby allowing the preferred embodiment of the present invention apparatus trimmer being automatically controlled for better operational management while grooming hair.

The method may include comparing the potential defects of interest to the results generated by design rule checking performed on design pattern data of the object to determine if the defects of interest correlate to design rule checking (DRC) critical points of differentiation between the output images displayed on VDD. In one such embodiment, the method may also include removing from the inspection data the defects that do not correlate with the critical points based on groomed hair using the superimposed 706 overlay grid hair style design patterns. In a similar manner, the method may include comparing the potential defects of interest to the results generated by optical rule checking (ORC) performed on design pattern data of the object. In general, steps described herein involving the use of VDD results may alternatively be performed using ORC results. Each of the embodiments of the method described above may include any other step(s) described herein such as using a predictive analytical 146 compare and contrast algorithm where the calculation of aerial view of image object pixels, color variation, etc in differing layers of superimposed overlay image to the original image are compared for accuracy to the original grooming design for improved instructional guidance training using artificial intelligence.

A storage medium, comprising program instructions executable on a computer system to perform a computer-implemented method for sorting defects in a design pattern of an object, wherein the computer-implemented method comprises: searching for defects of interest in inspection data using priority information and defect attributes associated with individual defects in combination with one or more characteristics of a region proximate the individual defects and one or more characteristics of the individual defects, wherein the inspection data is generated by comparing images of the object to each other to detect the individual defects in the design pattern of the object, wherein the images that are compared to each other are generated for different values of a superimposed overlay design variable, wherein the images comprise at least one reference image and at least one modulated image, and wherein the priority information is derived from a relationship between the individual defects and their corresponding modulation levels of the hair design variable; and assigning one or more identifiers to the defects of interest. A user interface may be configured to display any of the defects or just the sample images intermittently with reference images corresponding to the defect images. In this manner, the images may appear to highlight in the user video display device interface repeatedly one after the other. Such "highlighting" of the images may allow the user to gain additional understanding of the differences between the image layers. In a similar manner, sample images of differently modulated configurations may be highlighted in the user interface, which may aid in user understanding of trends of the defects historically so the user can use the compare and contrast analysis for improved grooming.

A methods described herein may also include a number of other filtering or sorting functions. For example, the method may include comparing the defects of interest to inspection data generated by design rule checking (DRC) performed on design pattern data of the object layers to determine if the defects of interest correlate to DRC defects. In one such embodiment, the method may include removing from the inspection data the DRC defects that do not correlate with the defects of interest within the targeted grooming plane area. DRC could be a lenient based on male pattern baldness, hair bumps, receding hairline, or other source layer imperfections.

A computer-implemented method for detecting and sorting defects in a design pattern of an object. Certain embodiments relate to a computer-implemented method that includes generating a composite reference image from two or more reference images and using the composite reference image for comparison with other sample images for defect detection. Interfaced with the AI engine, the multiple grid reference point positions and corresponding images may be used in order to generate an output image based on images corresponding to grid angles are the basis for the present invention method, system and apparatus grooming solution being used to accurately groom a user's hair based on the display views and superimposed overlay designs.

An imaging apparatus, comprising: a camera for recording a plurality of input images; and a processor configured to: generate a first output image based on the plurality of input images; and remove an object from the first output image to generate a second output image; wherein, for the generation of the second output image, the processor is configured to: apply an image transformation in the form of a superimposed overlay grooming hair design style in correlation to the first output image to obtain transmitted transformation data; delete a predetermined portion of a transform image representing the transform data the transmitted transformed image data being modified by the deletion of the predetermined portion; and generate a non-transform image based on the modified transform data embodied within the translucent superimposed overlay area.

Furthermore, it will be appreciated that the camera may transmit each image after its recordation or may otherwise transmit them in a single batch transfer. Program instructions implementing methods such as those described herein may be transmitted over or stored on the carrier medium. The carrier medium may be a transmission medium such as a wire, cable, or wireless transmission link, or a signal traveling along such a wire, cable, or link. The carrier medium may also be a storage medium such as a read-only memory, a random access memory, a magnetic or optical disk, or a magnetic tape.

An imaging apparatus, comprising: a camera for recording a plurality of input images; and a processor configured to: generate a first output image based on the plurality of input images; determine a contribution of an object to image intensity values of the first output image by determining values of variation in one of a horizontal and a vertical direction wherein the imaging apparatus, wherein the processor is configured to: determine a tilt of the superimposed overlay grooming grid pattern for image stabilization with respect to an imaging area of the at least one of the input images; rotate the transmitted image at least one of the input images to negate the tilt for proper orientation; for the software interfaced with the processor aligns the image captured by the ICD to maintain proper orientation using sensors for image pixel analysis.

The processor may take various forms, including a personal computer system, mainframe computer system, workstation, network appliance, Internet appliance, personal digital assistant ("PDA"), smart phone, television system or other processor enabled device. In general, the term "computer system" may be broadly defined to encompass any device having one or more processors, which executes instructions from a memory medium. In addition, the processor may include a processor as described here within incorporated by reference above, which are particularly suitable for handling a relatively large amount of image data substantially simultaneously.

Consistent with the imaging invention to determine the current health status of a viewable plan area for suggesting beauty products, an alternative embodiment of the imaging device, being a system, method, and apparatus that includes identifying, using a scanner machine or mobile imaging device ; embodied as a stand alone desk top unit or part of a multi-functional device; wherein device allows for user to scan retail receipts into an optical character reading (OCR) system interfaced with an interactive marketing system; comprising a cpu, database, storage, and using predictive analytics for matching promotional products based on the purchase product information read from the receipt.

Additionally, the system can send promotional coupons in digital form to a users mobile device using sms text messaging. Alternatively, the system can send promotional product coupons to a users online profile for loading digital coupons on mobile device memory; digital coupons placed on a stored value card or credit card; or coupon offers sent to users home address. In an alternative example embodiment of the present invention, the use of a mobile device having an image capture scanning device interfaced to a processor with OCR system capable of capturing the retail receipt to initiate the promotional product coupon being sent to user's mobile device for loading onto a devices memory and associated profile account.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed:

1. An grooming device, comprising:
- at least one sensor and at least one input component for detecting and recording at least one image of a targeted hair grooming area;
- a processor;
- a memory device;
- a transmitter/receiver; and
- a display visible to a user handling the grooming device while using the hair grooming device at the user's targeted hair grooming area;
- wherein the at least one sensor and the at least one input component, processor, memory and transmitter/receiver are configured in electronic connection interfaces for viewing a targeted hair grooming area; and
- wherein the memory device comprises at least one hairstyle overlay in which the processor is configured to overlay on the at least one image recorded by the at least one sensor and the at least one input component to where the at least one hairstyle overlay remains in synch with the at least one image during a grooming process.

2. The device according to claim 1, further comprising a hard wired electrical feed or rechargeable battery, having at least an indicator light for denoting camera activities.

3. The device according to claim 1, wherein the processor is further configured to identify and determine at least one of a motion and direction the hair grooming trimming takes in response to the at least one hairstyle overlay and at least one characteristic of the hair grooming area.

4. The device according to claim 3, wherein the processor produces at least one optical scanning image of the targeted hair grooming area with visual indicators viable in the display.

5. The device according to claim 1, wherein the at least one sensor and at least one input component produce at least one three-dimensional image viewable on the display.

6. The device according to claim 5, wherein the 3D image is divided into divided into two or more display sub-regions with at least one of hairstyle overlay for each sub-region.

7. The device according to claim 5, wherein the at least one hairstyle overlay comprises at least one set of display rules for each display sub-region.

8. The device according to claim 1, further comprising a geospatial positioning system configured to deploy a grid map to provide for at least one of remaining synch the at least one hairstyle overlay with the at least one image during the grooming process and guidance of the grooming device.

9. The device according to claim 1, wherein the device is a robotic grooming device configured to complete the grooming process of the user without interaction from the user.

10. The device according to claim 1, wherein the at least one sensor and at least one input component are further configured to analyze at least one of hair and skin health of the user at the grooming area.

11. The device according to claim 10, wherein at least one promotional coupon may be identified based on the at least one of hair and skin health of the user at the grooming area.

12. The device according to claim 10, further comprising predictive analytical engine configured to analyze defects in at least one of hair and skin health of user at the grooming area.

13. A method comprising:
- detecting and recording at least one image of a targeted hair grooming area with at least one sensor and at least one input component that is a part of a hair grooming trimmer;
- displaying the at least one image to he visible to a user handling the hair grooming trimmer while using the hair grooming trimmer at the user's targeted hair grooming area on a display device;
- overlaying at least one hairstyle overlay, provided by a memory device and a processor, on the at least one image recorded by the at least one sensor and the at least one input component to where the at least one hairstyle overlay remains in synch with the at least one image during a groom in g process.

14. The method according to claim 13, further comprising determining at least one of a motion and direction the hair grooming trimming takes in response to the at least one hairstyle overlay and at least one characteristic of the hair grooming area as identified by the processor.

15. The method according to claim 13, further comprising produces at least one optical scanning image of the targeted hair grooming area with visual indicators viable in the display with the processor.

16. The method according to claim 13, wherein displaying the at least one image and overlaying the at least one hairstyle overlay is provide at least one three-dimensional image viewable on the display device.

17. The method according to claim 13, further comprising deploying a grid map to provide for at least one of remaining synch the at least one hairstyle overlay with the at least one image during a grooming process and guidance of the hair grooming trimmer with a geospatial positioning system and a computational engine.

18. The method according to claim 13, further comprising analyzing at least one or hair and skin health of the user at the grooming area with the at least one sensor and at least one input component and displaying an anomaly identified when analyzing at least one of hair and skin health.

19. The method according to claim 18, farther comprising identifying at least one promotional coupon based on the at least one of hair and skin health of the user at the grooming area on at least one of the display, a mobile device and an on-line retrieval location.

* * * * *